US012088525B2

(12) United States Patent
Shi et al.

(10) Patent No.: US 12,088,525 B2
(45) Date of Patent: Sep. 10, 2024

(54) INFORMATION TRANSMISSION METHOD AND APPARATUS AND COMMUNICATION DEVICE

(71) Applicant: GUANGDONG OPPO MOBILE TELECOMMUNICATIONS CORP., LTD., Guangdong (CN)

(72) Inventors: Zhihua Shi, Dongguan (CN); Wenhong Chen, Dongguan (CN); Yun Fang, Dongguan (CN); Yingpei Huang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 243 days.

(21) Appl. No.: 17/565,293

(22) Filed: Dec. 29, 2021

(65) Prior Publication Data
US 2022/0123898 A1    Apr. 21, 2022

Related U.S. Application Data

(63) Continuation of application No. PCT/CN2019/096914, filed on Jul. 19, 2019.

(51) Int. Cl.
*H04L 5/00* (2006.01)
*H04L 1/00* (2006.01)
(Continued)

(52) U.S. Cl.
CPC .......... *H04L 5/0051* (2013.01); *H04L 1/0026* (2013.01); *H04W 52/146* (2013.01); *H04W 52/30* (2013.01); *H04W 72/20* (2023.01)

(58) Field of Classification Search
CPC ..... H04L 5/00; H04L 1/00; H04L 1/16; H04L 1/18; H04L 1/20; H04L 12/24; H04L 12/54; H04L 12/56; H04L 25/02; G01S 3/04; G01S 7/02; G01S 5/02; H04B 7/10; H04B 7/15; H04B 7/26; H04B 17/00; (Continued)

(56) References Cited

U.S. PATENT DOCUMENTS

| 9,055,544 B2* | 6/2015 | Worrall | ............... H04W 52/367 |
| 9,961,648 B2* | 5/2018 | Kwon | ................. H04W 52/365 |

(Continued)

FOREIGN PATENT DOCUMENTS

| CN | 108632891 A | 10/2018 |
| CN | 109088661 A | 12/2018 |

(Continued)

OTHER PUBLICATIONS

Apple "Considerations on Multi-panel and MPE in FR2" 3GPP TSG RAN WGI #97 R1-1907343, May 4, 2019 (May 4, 2019), entire document.

(Continued)

*Primary Examiner* — Man U Phan
(74) *Attorney, Agent, or Firm* — Ladas & Parry, LLP

(57) ABSTRACT

The embodiments of the present disclosure provide information transmission methods and apparatuses, and a communication device. The method includes: sending reporting information including at least one first information that is associated with at least one reference signal resource to a network device by a terminal device.

16 Claims, 15 Drawing Sheets

(51) Int. Cl.
*H04W 52/14* (2009.01)
*H04W 52/30* (2009.01)
*H04W 72/20* (2023.01)

(58) Field of Classification Search
CPC .......... H04B 7/00; H04B 1/38; H04W 72/04;
H04W 52/14; H04W 52/30; H04W 52/36;
H04W 52/24; H04W 72/12; H04W 76/27;
H04W 4/02; H04W 8/00; H04W 76/02;
H04W 24/00; H04W 28/06; H04W 92/10
USPC .......................................................... 370/329
See application file for complete search history.

(56) References Cited

U.S. PATENT DOCUMENTS

| | | | |
|---|---|---|---|
| 10,111,112 B2* | 10/2018 | Yang | H04W 72/23 |
| 10,383,067 B2* | 8/2019 | Lin | H04W 52/367 |
| 10,708,919 B2* | 7/2020 | Subramanian | H04B 7/063 |
| 10,728,900 B2* | 7/2020 | Futaki | H04W 72/542 |
| 10,912,041 B2* | 2/2021 | Lee | H04W 76/27 |
| 10,993,192 B2* | 4/2021 | Lin | H04W 52/42 |
| 11,051,282 B2* | 6/2021 | Chen | H04W 72/21 |
| 11,122,523 B2* | 9/2021 | You | H04W 52/242 |
| 11,177,920 B2* | 11/2021 | Wu | H04L 47/821 |
| 11,368,926 B2* | 6/2022 | Sampath | H04W 72/12 |
| 2018/0167897 A1 | 6/2018 | Sampath et al. | |
| 2018/0219664 A1 | 8/2018 | Guo | |
| 2019/0053170 A1 | 2/2019 | Lee et al. | |
| 2019/0141692 A1 | 5/2019 | Subramanian et al. | |
| 2019/0181932 A1 | 6/2019 | Jayawardene | |
| 2020/0022094 A1 | 1/2020 | You et al. | |
| 2020/0288412 A1 | 9/2020 | Ajdakple et al. | |
| 2021/0306060 A1* | 9/2021 | Matsumura | H04B 7/0626 |

FOREIGN PATENT DOCUMENTS

| | | |
|---|---|---|
| CN | 109842470 A | 6/2019 |
| CN | 109964513 A | 7/2019 |
| EP | 3576452 A1 | 12/2019 |
| WO | 2018026223 A1 | 2/2018 |
| WO | 2018171759 A1 | 9/2018 |
| WO | 2018174605 A1 | 9/2018 |
| WO | 2019049999 A1 | 3/2019 |
| WO | 2019099634 A1 | 5/2019 |

OTHER PUBLICATIONS

International Search Report in the international application No. PCT/CN2019/096914, mailed on Apr. 9, 2020.
Written Opinion of the International Searching Authority in the international application No. PCT/CN2019/096914, mailed on Apr. 9, 2020, with English translation provided by Google Translate.
VIVO, "Further discussion on Multi-Beam Operation", 3GPP TSG RAN WG1 #97, R1-1906160, Reno, USA, May 13-17, 2019, entire document.
Intel Corporation, "On Beam Management Enhancement", 3GPP TSG RAN WG1 Ad-Hoc Meeting 1901, R1-1900503, Taipei, Jan. 21-25, 2019, entire document.
Huawei et al. "Correction on beam ordering in beam report", 3GPP TSG-RAN2 NR Ad Hoc, R2-1801592, Vancouver, Canada, Jan. 22-26, 2018, entire document.
Ericsson, "Beam sorting order for measurement reporting", 3GPP TSG-RAN WG2 AH-1801 R2-1801314, Vancouver, Canada, Jan. 22-26, 2018, entire document.
Supplementary European Search Report in the European application No. 19939025.3, mailed on May 23, 2022.
Written Opinion of the International Search Authority in the international application No. PCT/CN2019/096914, mailed on Apr. 9, 2020 with translation provided by WIPO.
3GPP TSG RAN WG1 Meeting #96bis R1-1904314, Xi'an, China, Apr. 8-12, 2019, Source: Intel Corporation, Title: On Beam Management Enhancement, Agenda item: 7.2.8.3, Document for: Discussion and Decision, 15 pages.
First Office Action of the corresponding Chinese application No. 201980092833.6, issued on Oct. 25, 2023, with English translation.
Notice of Allowance of the correponding Chinese application No. 201980092833.6, issued on Feb. 4, 2024 with search report. 6 pages with English translation.
First Office Action of the corresponding European application No. 19939025.3, issued on May 8, 2024.

* cited by examiner

Reporting information including at least one first information that is associated with at least one reference signal resource is sent by a terminal device to a network device — 301

FIG. 3

INFORMATION TRANSMISSION METHOD AND APPARATUS AND COMMUNICATION DEVICE

CROSS REFERENCE TO RELATED APPLICATION

This application is a continuation application of International Patent Application No. PCT/CN2019/096914 filed on Jul. 19, 2019, the content of which is incorporated herein by reference in its entirety.

TECHNICAL FIELD

The embodiments of the present disclosure relate to the field of mobile communication technology, and in particular to an information transmission method and apparatus, and a communication device.

BACKGROUND

In a multi-antenna system, a network may indicate a corresponding uplink (UL) transmit beam to a terminal based on a downlink (DL) transmit beam. When the terminal uses the uplink transmit beam, corresponding power reduction may be performed based on whether the uplink transmit beam is facing a human body and a relative distance to the human body, which may cause a maximum permissible exposure (MPE) problem.

SUMMARY

The embodiments of the present disclosure provide an information transmission method and apparatus, and terminals.

An information transmission method according to the embodiments of the present disclosure includes that reporting information including at least one first information that is associated with at least one reference signal resource is sent by a terminal device to a network device.

An information transmission method according to the embodiments of the present disclosure includes that reporting information that is sent by a terminal device and includes at least one piece of first information associated with at least one reference signal resource is received by a network device.

An information transmission apparatus according to the embodiments of the present disclosure includes a sending unit configured to send reporting information including at least one first information that is associated with at least one reference signal resource to a network device.

An information transmission apparatus according to the embodiments of the present disclosure includes a receiving unit configured to receive reporting information that is sent by a terminal device and includes at least one first information associated with at least one reference signal resource.

A communication device according to the embodiments of the present disclosure includes a processor and a memory. The memory is configured to store a computer program, and the processor is configured to call and run the computer program stored in the memory to execute the above information transmission methods.

A chip according to the embodiments of the present disclosure is provided for implementing the above information transmission methods.

Specifically, the chip includes: a processor that is configured to call and run a computer program from the memory to cause a device installed with the chip to execute the above information transmission methods.

A computer-readable storage medium according to the embodiments of the present disclosure is provided for storing a computer program, and the computer program enables a computer to execute the above information transmission methods.

A computer program product according to the embodiments of the present disclosure includes computer program instructions, and the computer program instructions cause a computer to execute the above information transmission methods.

A computer program according to the embodiments of the present disclosure is provided. When the computer program runs on a computer, the computer program causes the computer to execute the above-mentioned information transmission methods.

By the above technical solutions, with respect to the MPE problem, a terminal device may send reporting information to a network device, and the network device may perform beam management based on the reporting information, thereby reducing the impact on system performance.

BRIEF DESCRIPTION OF THE DRAWINGS

The drawings described here are used to provide a further understanding of the present disclosure and constitute a part of the present disclosure. The exemplary embodiments and descriptions of the present disclosure are used to explain the present disclosure and do not constitute an improper limitation of the present disclosure. In the attached drawings:

FIG. 3 illustrates a schematic flowchart of an information transmission method according to an embodiment of the present disclosure.

DETAILED DESCRIPTION

The technical solutions in the embodiments of the present disclosure will be described below in combination with the drawings in the embodiments of the present disclosure. It is apparent that the described embodiments are a part of the embodiments of the present disclosure, not all of the embodiments. According to the embodiments in the present disclosure, all other embodiments obtained by those of ordinary skill in the art without creative work shall fall within the protection scope of the present disclosure.

The technical solutions in the embodiments of the present disclosure may be applied to various communication systems, such as: a global system of mobile communication (GSM) system, a code division multiple access (CDMA) system, a wide band code division multiple access (WCDMA) system, general packet radio service (GPRS), a long term evolution (LTE) system, an LTE frequency division duplex (FDD) system, an LTE time division duplex (TDD), a universal mobile telecommunication system (UMTS), a worldwide interoperability for microwave access (WiMAX) communication system or a 5G system, etc.

Figure 1:
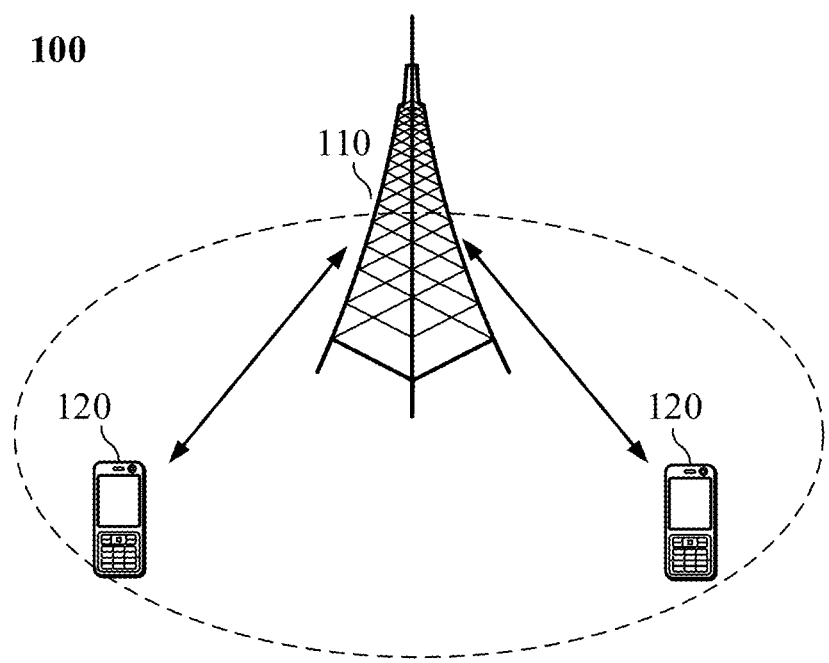
FIG. 1 illustrates a schematic diagram of a communication system architecture according to an embodiment of the present disclosure.

For example, the communication system 100 applied in the embodiments of the present disclosure is illustrated in FIG. 1. The communication system 100 may include a network device 110, and the network device 110 may be a device that communicates with a terminal 120 (or called as a communication terminal or a terminal). The network device 110 may provide communication coverage for a specific geographic area, and may communicate with terminals located in the coverage area. Optionally, the network device 110 may be a base transceiver station (BTS) in a GSM system or a CDMA system, a base station (NodeB, NB) in a WCDMA system, or an evolved base station in an LTE system (Evolutional Node B, eNB or eNodeB), or the wireless controller in the cloud radio access network (CRAN), or the network device may be a mobile switching center, a relay station, an access point, a vehicle-mounted device, a wearable device, a hub, a switch, a bridge, a router, and a network side device in a 5G network, or a network device in the future evolution of the public land mobile network (PLMN), etc.

The communication system 100 may further include at least one terminal 120 located within the coverage area of the network device 110. "Terminal" as used herein includes, but is not limited to, any device connected via wired lines, such as via a public switched telephone network (PSTN), a digital subscriber line (DSL), a digital cable, and a direct cable connection; and/or via another data connection/network; and/or via a wireless interface, such as for a cellular network, a wireless local area network (WLAN), a digital TV network such as a DVB-H network, a satellite network, an AM-FM broadcast transmitter; and/or an apparatus of another terminal configured to receive/send communication signals; and/or an internet of things (IoT) device. A terminal configured for communication through a wireless interface may be referred to as a "wireless communication terminal", a "wireless terminal" or a "mobile terminal". Examples of mobile terminals include, but are not limited to, satellite or cellular phones; personal communications system (PCS) terminals that can combine cellular radio phones with data processing, fax, and data communication capabilities; a PDA that may include a radio phone, a pager, an Internet/ intranet access, a Web browser, a memo pad, a calendar, and/or global positioning system (GPS) receiver; as well as a conventional laptop and/or palmtop receiver or other electronic devices including a radio telephone transceiver. "Terminal" may refer to an access terminal, a user equipment (UE), a user unit, a user station, a mobile station, a remote station, a remote terminal, a mobile device, a user terminal, a terminal, a wireless communication device, a user agent, or a user apparatus. The access terminal may be a cellular phone, a cordless phone, a session initiation protocol (SIP) phone, a wireless local loop (WLL) station, a personal digital assistant (PDA), and a handheld device with wireless communication function, a computing device or other processing devices connected to a wireless modem, a vehicle-mounted device, a wearable device, a terminal in a 5G network, or a terminal in the future evolution of PLMN, etc.

Optionally, device to device (D2D) communication may be performed between the terminals 120.

Optionally, the 5G system or the 5G network may also be referred to as a new radio (NR) system or a NR network.

FIG. 1 exemplarily illustrates one network device and two terminals. Optionally, the communication system 100 may include a plurality of network devices and the coverage of each network device may include other numbers of terminals than two, which will not be limited in the embodiments of the present disclosure.

Optionally, the communication system 100 may also include other network entities such as a network controller and a mobility management entity, which will not limited in the embodiments of the present disclosure.

It should be understood that a device with a communication function in the network/system in the embodiments of the present disclosure may be referred to as a communication device. Taking the communication system 100 illustrated in FIG. 1 as an example, the communication device may include a network device 110 and a terminal 120 with communication functions, and the network device 110 and the terminal 120 may be the specific devices described above, which will not be repeated here. The communication device may also include other devices in the communication system 100, such as other network entities such as a network controller and a mobility management entity, which will not be limited in the embodiments of the present disclosure.

It should be understood that the terms "system" and "network" in the disclosure are often used interchangeably. The term "and/or" is only an association relationship describing the associated objects, which means that there can be three kinds of relationships. For example, A and/or B may represent these three situations including that: A alone exists, A and B exist at the same time, and B alone exists. In addition, the character "/" generally indicates that the associated objects before and after the character "/" are in an "or" relationship.

In order to facilitate the understanding on the technical solutions in the embodiments of the present disclosure, the related technologies involved in the embodiments of the present disclosure will be described below.

Multi-Beam System

In the NR/5G multi-beam (Multi-beam) system, the transmit power is concentrated to a narrow beam in the downlink to cover part of area in a cell, thereby enhancing the coverage of the entire system.

Figure 2A:
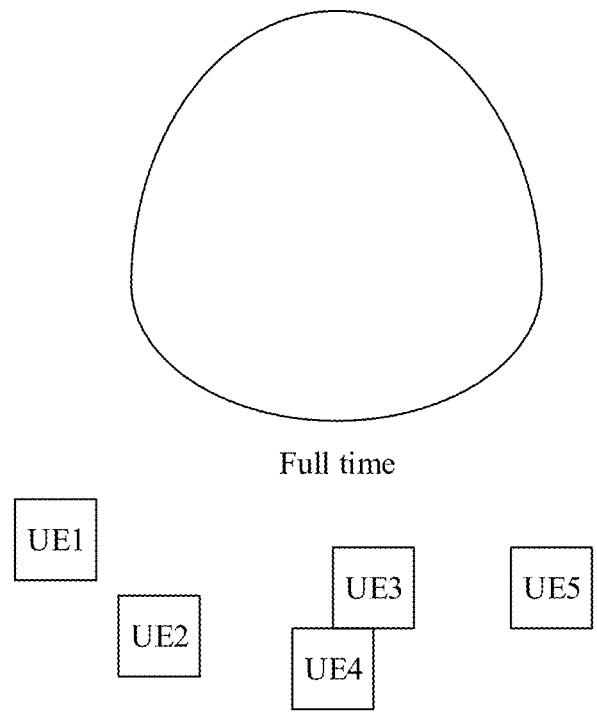
FIG. 2A illustrates a schematic diagram without a traditional system according to an embodiment of the present disclosure.

In traditional network deployments (such as 3G, 4G/LTE), a beam (in traditional systems, it is not required to mention the concept of beam particularly, because there is only one beam) is used to cover the entire cell. For example, in FIG. 2A, a relatively wide beam may be used by network to cover the entire cell and can serve UEs in the cell at the same time. In NR, a relatively narrow beam may be used, so that energy can be concentrated and UEs far away from the cell may also have good reception performance.

Figure 2B:
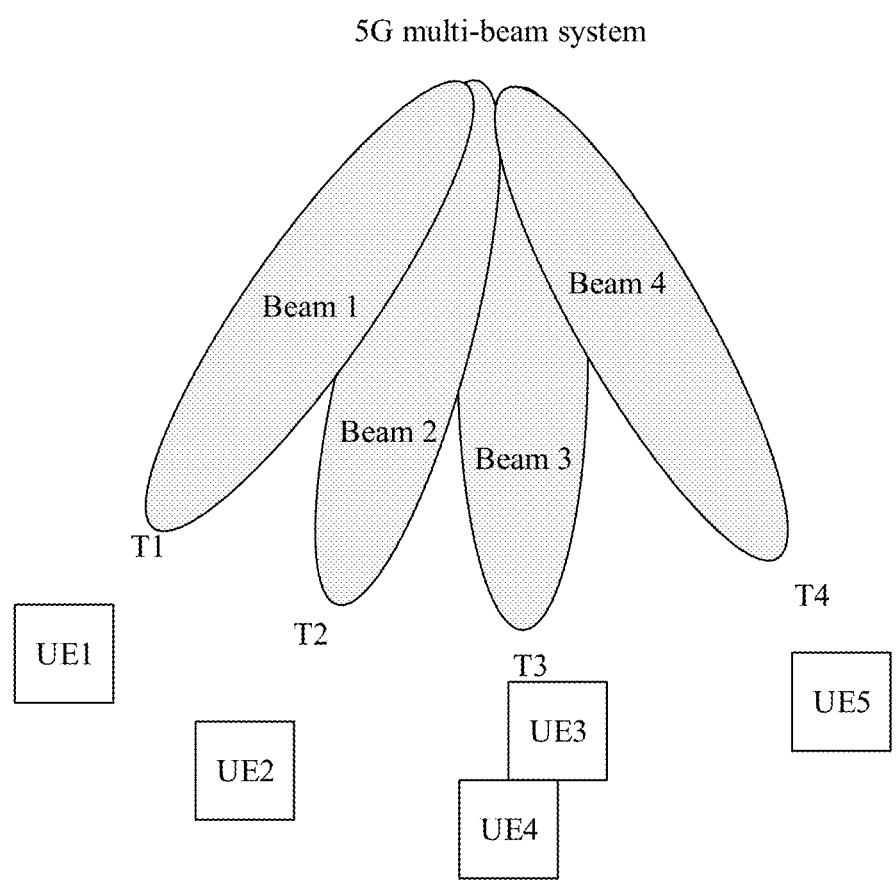
FIG. 2B illustrates a schematic diagram of a 5G multi-beam system according to an embodiment of the present disclosure.

In the Multi-beam system, beam sweeping in terms of time may be performed to achieve the effect of covering the entire cell, that is, different beams may be used at different times to cover different areas. For example, as illustrated in FIG. 2B, in the multi-beam system, four different beams may be used to cover different areas at different times. The UE in the cell can only communicate with the network when a certain beam covers the entire area at a certain time. For example, in the system, beam 3 may be used to cover UE3 and UE4 at time T3.

The situation where a plurality of transmit beams are used in the downlink is described in the above solution. Similarly, the UE may also use a plurality of transmit beams for uplink transmission, and the principle is similar.

It should be noted that different beams may be identified or indicated by different signals or corresponding reference signal resources carried on them, specifically:

A synchronization signal block (Synchronization Signal/PBCH Block, SSB) may be used to indicate a corresponding uplink or downlink transmit beam. The SSB here refers to a SS/PBCH block, for example, different synchronization signal blocks may be transmitted on different downlink beams.

A channel state information reference signal (CSI-RS)/CSI-RS resource may be used to indicate a corresponding uplink or downlink transmit beam, for example, different signals corresponding to CSI-RS signal resources may be transmitted on different downlink beams.

A sounding reference signal (SRS)/SRS signal resource may be used to indicate a corresponding uplink or downlink transmit beam, for example, signals corresponding to different SRS resources may be transmitted on different beams.

When there is beam correspondence on the UE side (for example, when the reception beam X is a better/best choice for receiving downlink signals, the UE may deduce from the reception beam X that its corresponding transmit beam Y is a better/best uplink transmit beam), if the network indicates that a downlink signal corresponding to a certain downlink transmit beam is A, the UE can know the corresponding transmit beam C based on the reception beam B corresponding to the received signal A. In this case, indicating the uplink transmit beam C of the UE in the system may be realized by directly indicating the downlink signal A to indirectly indicate the transmit beam C.

The uplink transmit beam may be called as a spatial filter (or a spatial domain filter).

Therefore, it can correspond to a certain beam/certain beams based on an uplink or downlink signal.

Methods of Determining an Uplink Transmit Beam for a UE by a Network

When the UE has a plurality of uplink transmit beams, the network may determine which uplink transmit beam to be used by the UE by following methods.

Method 1: The network configures a plurality of SRS resources so that the UE may use different uplink transmit beams for corresponding SRS transmissions (different signals corresponding to SRS resources may be sent on different uplink transmit beams). The network may know the link quality corresponding to these uplink transmit beams by measuring the SRS signals.

Method 2: When there is beam correspondence on the UE side, according to this characteristic, the network considers that the UE may know its corresponding reception beam based on its corresponding better downlink transmit beam and further know the better uplink transmit beam corresponding to the UE based on the beam correspondence. That is, the network may indicate a downlink reference signal resource, and the UE may determine a corresponding uplink transmit beam (or called as a spatial filter) based on the indication.

For the method 1, the network may configure periodic SRS (P-SRS), semi-persistent SRS (SP-SRS), and aperiodic SRS (AP-SRS) for UE for transmission.

For the method 2, the network may configure the UE to measure certain downlink signals (SSB, a signal corresponding to a CSI-RS resource) and report the measurement according to a certain rule, and the network may determine based on the report of the UE (optionally, including other factors, for example, the load of services on different beams) which downlink transmit beam or beams is/are better for the UE and then inform the UE to use the corresponding uplink transmit beam/beams by indicating the downlink reference signal resource.

Indication of an Uplink Transmit Beam by Network to UE

When the network indicates the UE to use an uplink transmit beam for transmission, the network may indirectly indicate the corresponding uplink transmit beam by indicating the identifier of the following corresponding reference signal resource:

SRS resource indicator (SRI);

Optionally, some signaling includes indication information corresponding to an uplink BWP indicator (BWP ID) of the uplink BWP where the SRS resource is located.

Synchronization signal block index (SSB index);

CSI-RS resource indicator (CSI-RS resource indicator).

For a physical uplink shared channel (PUSCH), a beam may be determined in the following manners:

Dynamically scheduled PUSCH

When the network only configures one corresponding SRS resource, the UE may determine which uplink transmit beam to be used according to network configuration information (for example, corresponding RRC signaling).

When the network configures a plurality of corresponding SRS resources, the UE may determine which uplink transmit beam to be used according to the SRS resources indicated by DCI indication information.

semi-persistently scheduled PUSCH

When an RRC parameter (RRC IE) configuredGrantConfig includes a parameter rrc-ConfiguredUplinkGrant, the UE may determine which uplink transmit beam to be used based on an SRS resource identifier indicated in the RRC parameter.

When the RRC parameter (RRC IE) configuredGrantConfig does not include the parameter rrc-ConfiguredUplinkGrant, the UE may determine which uplink transmit beam to be used based on an SRS resource indicated by DCI indication information.

For SRS transmission, the network configures spatial relationship information (SRS-SpatialRelationInfo) for SRS resources. The RRC IE of the SRS-SpatialRelationInfo is illustrated in Table 1 below, where the SRS-SpatialRelationInfo includes at least one of the following information:

I) an SRS resource indication identifier; optionally, indication information corresponding to an uplink BWP identifier (BWP ID) of the uplink BWP where the SRS resource is located may also be included;
  II) a synchronization signal block index; and
  III) a CSI-RS resource indicator.

TABLE 1

| SRS-SpatialRelationInfo ::= | SEQUENCE { |
|---|---|
| servingCellId OPTIONAL, -- Need S | ServCellIndex |
| referenceSignal | CHOICE { |
| ssb-Index | SSB-Index, |
| csi-RS-Index | NZP-CSI-RS-ResourceId, |
| srs | SEQUENCE { |
| resourceId | SRS-ResourceId, |
| uplinkBWP | BWP-Id |
| } | } |
| } | } |
| } | |

For physical uplink control channel (PUCCH) transmission, the network configures spatial relationship information (PUCCH-SpatialRelationInfo) for a PUCCH. The RRC IE of the PUCCH-SpatialRelationInfo is as illustrated in Table 2 below, where the PUCCH-SpatialRelationInfo includes at least one of the following information:

I) a SRS resource indication identifier; optionally, it also includes indication information corresponding to the uplink BWP identifier (BWP ID) where the SRS resource is located;
II) a synchronization signal block index; and
III) a CSI-RS resource indicator.

TABLE 2

| PUCCH-SpatialRelationInfo ::= | SEQUENCE { |
|---|---|
| pucch-SpatialRelationInfoId | PUCCH-SpatialRelationInfoId, |
| servingCellId OPTIONAL, -- Need S | ServCellIndex |
| referenceSignal | CHOICE { |
| ssb-Index | SSB-Index, |
| csi-RS-Index | NZP-CSI-RS-ResourceId, |
| srs | SEQUENCE { |
| resource | SRS-ResourceId, |
| uplinkBWP | BWP-Id |
| }, | } |
| ... | |
| } | |

When the network configures one piece of PUCCH-SpatialRelationInfo for PUCCHs, all PUCCH resources may determine which uplink transmit beam to be used according to this information configured by the network. When the network configures a plurality pieces of PUCCH-SpatialRelationInfo for PUCCHs, each PUCCH resource may determine which uplink transmit beam to be used according to the spatial relationship information indicated by further indication information or configuration information or activation information (for example, a MAC CE) of the network.

MPE Problem

For the safety of a human body, the transmit power of a UE needs to be controlled within a specified safety range. When the UE side uses a plurality of transmit beams for uplink transmission, relatively narrow beams may be used to concentrate energy for transmission. When the UE is close to a human body, it may happen that the transmit power or effective isotropic radiated power (EIRP) exceeds a safety limit, that is, the MPE problem occurs. One processing method is that when this situation happens, the UE may perform power reduction, that is, reducing the transmit power to ensure human safety. In this processing, if it does not distinguish whether different uplink transmit beams are aimed at the human body, that is, for safety reasons, it is assumed that each uplink transmit beam may be directed at the human body for power reduction, and the beam management mechanism may be work effectively.

However, in actual application scenarios, since uplink transmit beams have a certain directivity, when a beam is directed at a human body, if the transmit power or EIRP exceeds a specified safe value, power reduction is required; when a beam is not directed at a human body, power reduction may not be considered, or a value of the power reduction may be reduced. Common terminals may have some sensors, through which whether each beam or some beams are directed at a human body may be determined.

If corresponding power reduction is adopted for different beams or different beam groups directing at a human body, the beam management mechanism may degrade the system performance, as illustrated by the following examples.

A) According to the above method 1, in a case that the network configures an aperiodic SRS, an uplink transmit beam is selected based on the aperiodic SRS and the UE is notified to use the selected uplink transmit beam for uplink transmission, when the UE moves or rotates to cause the current operating uplink transmit beam to be directed at a human body and power reduction is required, the actual transmit power of the current uplink transmit beam link will be caused to become low, so there is another uplink transmit beam that has a better actual transmission effect, and in this case, the current uplink transmit beam is not an optimal choice. Therefore, certain information is needed to assist or suggest the network to re-select a beam.

B) According to the above method 2, the network determines an uplink transmit beam for the UE based on the best or better downlink transmit beam. When this uplink transmit beam is directed at a human body and power reduction is required, the actual transmit power of the current uplink transmit beam link will be caused to become low, so there is another uplink transmit beam with a better actual transmission effect, and the current uplink transmit beam is not an optimal choice any longer. Therefore, certain information is needed to assist or suggest the network to re-select a beam.

Figure 2C:
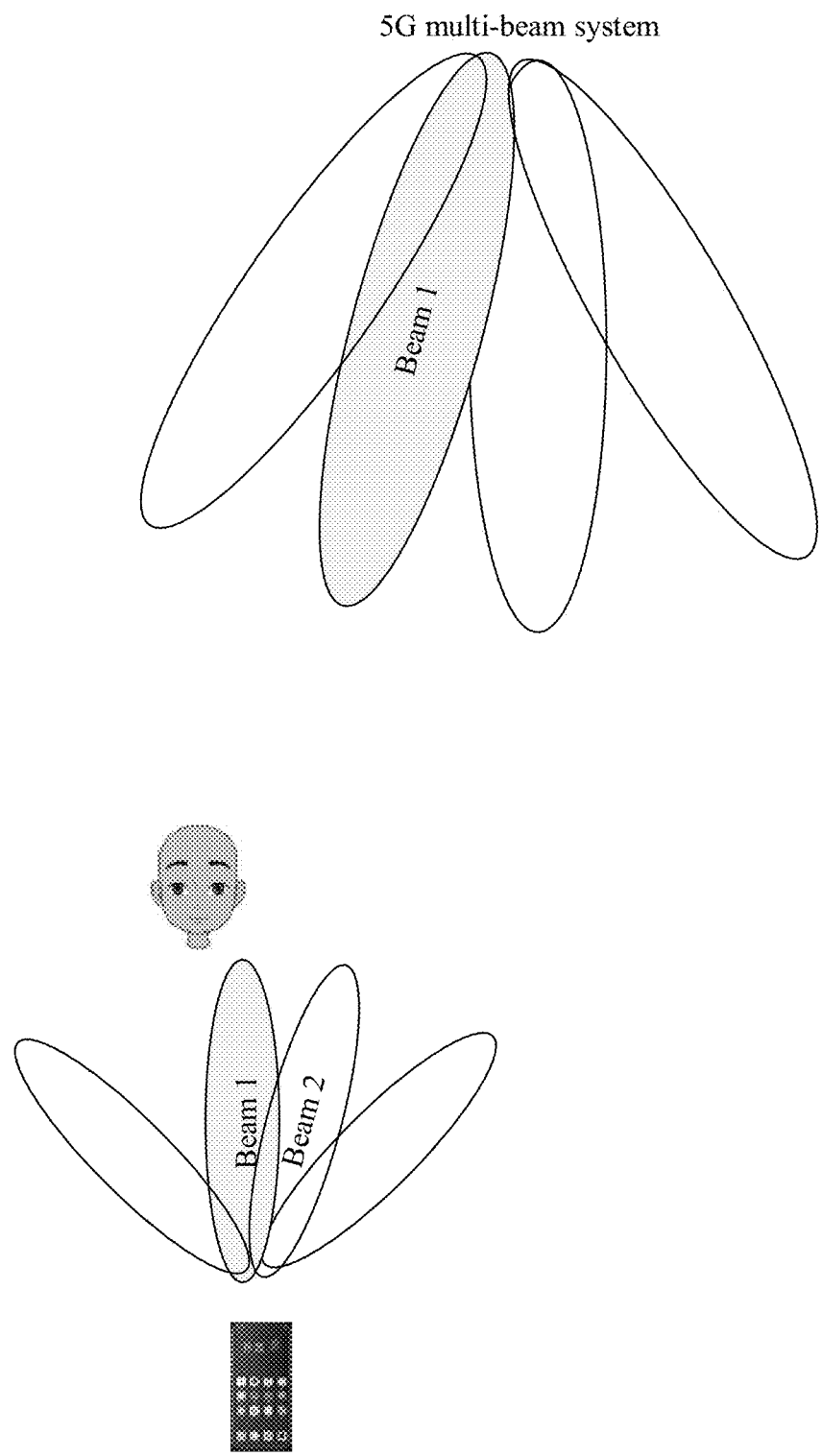
FIG. 2C illustrates a schematic diagram of a scenario according to an embodiment of the present disclosure.

For example, as illustrated in FIG. 2C, the network originally selects beam 1 as the best uplink transmit beam, but due to the fact that the beam 1 is directed at a human body, the UE is required to perform power reduction for beam 1. Therefore, it would be better if beam 2 is used (because beam 2 is not directed at the human body, power reduction may not be performed, or a value of power reduction is small).

With respect to the above problems, there has been not yet a solution. For this reason, the following technical solutions in the embodiments of the present disclosure are proposed. The technical solutions in the embodiments of the present disclosure describes reporting information of a terminal, and the report information is configured to assist or suggest a network to perform corresponding beam management procedures (for example, beam selection, beam indication).

FIG. 3 illustrates a schematic flowchart of an information transmission method according to an embodiment of the present disclosure. As illustrated in FIG. 3, the information transmission method includes the following operations.

In S301, reporting information including at least one first information that is associated with at least one reference signal resource is sent by a terminal device to a network device.

In an optional implementation of the present disclosure, the network device may send first configuration information to the terminal device, and the terminal device may receive the first configuration information from the network device, and the first configuration information is configured to determine a group of reference signal resources; the terminal device may determine the reporting information based on the first configuration information.

Here, the group of reference signal resources corresponds to a group of candidate beams. The network device may control through the first configuration information the candidate beams (the candidate beams may be downlink beams or uplink beams) that are required to be considered by the terminal device, so as to avoid the terminal device from measuring or considering all of the beams, reducing complexity. In an example, the group of reference signal resources are measurement objects configured by the network device for the terminal device.

In an optional implementation of the present disclosure, the network device may send second configuration information to the terminal device, and the terminal device may receive the second configuration information from the network device, and the second configuration information is configured to determine the amount of at least one first information.

Here, the reporting information sent by the terminal may include at least one (one or more) first information, and the network device may control the amount of the first information reported by the terminal device through the second configuration information.

In an optional implementation of the present disclosure, the network device may send third configuration information to the terminal device, and the terminal device may receive the third configuration information from the network device, and the third configuration information is configured to determine a measurement report configuration; the terminal device may send the reporting information to the network device based on the third configuration information.

Here, the network device may control the measurement report of the terminal device through the third configuration information, which may avoid a bad behavior of an inferior terminal.

Furthermore, optionally, the third configuration information may at least include a report quantity configuration, and a value of the report quantity configuration may be a first report quantity. For example, the report quantity in the third configuration information may be configured as a new value (the first report quantity), and this new value is different from any of the following values: none, cri-RI-PMI-CQI, cri-RI-i1, cri-RI-i1-CQI, cri-RI-CQI, cri-RSRP, ssb-Index-RSRP, and cri-RI-LI-PMI-CQI.

Optionally, part or all of the first configuration information, the second configuration information, and the third configuration information may be transmitted in same signaling. For example, the first configuration information and the third configuration information may be transmitted in a same RRC IE.

In an optional implementation of the present disclosure, the terminal device may decide by itself, or send the reporting information to the network device based on a measurement result and/or a power reduction value.

Here, the terminal device may trigger (or decide) to send the reporting information based on its own implementation, or based on a measurement result, or based on a power reduction situation, or based on the measurement result and the power reduction situation. In this way, the reporting information may be sent according to an actual situation of the terminal device, which may reduce the overhead of the reporting information.

In the embodiments of the present disclosure, the terminal device may send the reporting information to the network device by using any of the following manners:

Manner 1: The terminal sends the reporting information to the network device through a physical layer channel.

Furthermore, in an optional implementation, the physical layer channel may be a PUCCH or a PUSCH.

Here, the reporting information may be sent through the physical layer channel, the report delay is small, the network may obtain the reporting information faster, and the network performance and user experience are improved.

Manner 2: The terminal sends the reporting information to the network device through high-level signaling.

Furthermore, in an optional implementation, the high-level signaling may be media access control control element (MAC CE) signaling.

Here, the reporting information may be sent through high-level signaling, so that the physical layer protocol process and the terminal implementation may be greatly simplified.

The specific contents of the reporting information will be described in detail below. For the case where the terminal device sends the reporting information to the network device through the physical layer channel, the contents of the reporting information are described below by the following solution 1 or solution 2.

Solution 1

The reporting information includes at least one first information. Each first information in the at least one first information corresponds to a reference signal or a reference signal resource, or, each first information in the at least one first information corresponds to a group of reference signals or a group of reference signal resources.

Here, the reporting information may include a rich amount of information, which makes the system more flexible and may reduce the delay of the entire beam management process.

In an optional implementation, each first information in the at least one first information may carry first indication information, and the first indication information is configured to indicate a reference signal resource.

Furthermore, optionally, the first indication information is configured to indicate SRS resources or SSB or CSI-RS resources.

For example, the first indication information may indicate an SRS resource, the SRS resource is associated with a beam, and the beam corresponds to better transmission performance. This can be applied to systems with good beam correspondence and less ideal beam correspondence.

For example, the first indication information may indicate an SSB, the SSB is associated with a beam, and the beam corresponds to better transmission performance. This may be applied to systems with better beam correspondence.

For example, the first indication information may indicate a CSI-RS resource, the CSI-RS resource is associated with a beam, and the beam corresponds to better transmission performance. This can be applied to systems with better beam correspondence.

It should be noted that the reporting information may include at least one first indication information, and different first indication information in the at least one first indication information may indicate a same type of reference signal resources, or may indicate different types of reference signal resources. For example, the first indication information in one first information indicates one CSI-RS resource, and the first indication information in another first information indicates one SSB.

Furthermore, optionally, the reporting information may include at least one first indication information, and the position of the at least one first indication information in the report information is configured to indicate the priority of at least one reference signal resource indicated by the at least one first indication information.

Here, in the reporting information, the priority of the reference signal resource indicated by the first indication information at the front of the reporting information is higher than the priority of the reference signal resource indicated by the first indicated information at the back of the reporting information, or the priority of the reference signal resource indicated by the first indication information at the front of the reporting information is lower than the priority of the reference signal resource indicated by the first indication information at the back of the reporting information. In the technical solutions of the embodiments of the present disclosure, the terminal device may implicitly notify priority information to the network device through the position of the first indication information, so as to assist the network device to make better beam judgments.

In an optional implementation, each first information in the at least one first information may carry reference signal receiving power (RSRP) information corresponding to the reference signal resource corresponding to the first information.

Furthermore, optionally, the RSRP information may be determined by the terminal device based on an RSRP value obtained by measurement. For example, the RSRP information may be obtained after the terminal device quantifies the RSRP value obtained by measurement. Here, the first information may carry the RSRP information corresponding to a downlink beam, which may assist the network device in determining the downlink beam.

Furthermore, optionally, the RSRP information may be determined by the terminal device based on an RSRP value obtained by measurement and a power reduction value. For example, the RSRP information may be obtained by the terminal device by adjusting the RSRP value obtained by measurement based on the power reduction value. Here, power reduction value is taken into account for the RSRP information reported by the terminal device, so that this RSRP information may assist the network device in determining an uplink transmit beam.

In an optional implementation, each first information in the at least one first information may carry priority information of the reference signal resource corresponding to the first information.

Here, the priority information may also be referred to as sorting indication information. For example, the smaller the sorted sequence number, the higher the priority; or the smaller the sorted sequence number, the lower the priority. By including the priority information of the corresponding reference signal resource into each first information, the priority indication may be made more flexible.

In an optional implementation, each first information in the at least one first information may carry the first parameter of the reference signal resource corresponding to the first information.

Furthermore, optionally, the first parameter carried in the first information may be determined based on a parameter associated with the reference signal resource corresponding to the first information.

In the above solution, the first parameter may include at least one of the following: maximum output power, a power headroom, and power reduction information.

For example, each first information the at least one first information may carry the maximum output power (P_CMAX) of the reference signal resource corresponding to the first information, where P_CMAX is the configured maximum output power. Here, the impact of the power reduction may be implicitly indicated by P_CMAX, so as to avoid displaying the power back off information in the reporting information and avoid disclosing the specific implementation of the terminal. Furthermore, the P_CMAX may be determined based on a parameter associated with a corresponding reference information resource. For example, certain first information may correspond to a reference signal resource X, and the P_CMAX carried in this first information may be also determined based on the parameter corresponding to the reference signal resource X. P_CMAX here is beam-specific P_CMAX.

For example, each first information in the at least one first information may carry the power headroom of the reference signal resource corresponding to the first information. Here, the impact of the power reduction may implicitly indicated by the power headroom, so as to avoid displaying the power reduction information in the reporting information and avoid disclosing the specific implementation of the terminal. Furthermore, the power headroom may be determined based on the parameter associated with the corresponding reference information resource, for example, certain first information may correspond to the reference signal resource Y, and the power headroom carried in this first information may also be determined based on the parameter corresponding to the reference signal resource Y, the power headroom here may be beam-specific power headroom. Furthermore, optionally, a type of the power headroom carried in the first information may be Type 1 (Type 1) or Type 2 (Type 2), where Type 1 is the power headroom for a PUSCH, Type 2 is the power headroom for a SRS.

For example, each first information in the at least one first information may carry power reduction information of the reference signal resource corresponding to the first information. Here, the impact of the power reduction is explicitly shown in the reporting information, which may directly show the impact of the uplink output power. Furthermore, the power reduction information may be determined based on a parameter associated with the corresponding reference information resource, for example, certain first information may correspond to the reference signal resource Z, and the power reduction information carried in this first information may be also determined based on the parameter corresponding to the reference signal resource Z, where the power reduction is beam-specific power reduction.

In the above solution, optionally, the reporting information may include at least one first parameter, and the position of the at least one first parameter in the report information is configured to indicate the priority of the at least one reference signal resource corresponding to the at least one first information.

Optionally, the position of the at least one RSRP information or the position of the at least one first parameter in the reporting information may be determined according to at least one of the following:

a position of the at least one reference signal resource corresponding to the at least one first information in the first configuration information;

an identifier of the at least one reference signal resource corresponding to the at least one first information; and a type of the at least one reference signal resource corresponding to the at least one first information.

In the embodiments of the present disclosure, for a certain reference signal resource (for a certain uplink transmit beam), at least one of its corresponding maximum output power, a power headroom, and power reduction information may be determined in the following manners:

Manner 1: In a case where an uplink signal is transmitted by the terminal device, at least one of the maximum output power, the power headroom, and the power reduction information is determined according to the uplink signal (including uplink data and an uplink reference signal) transmitted by the terminal device.

Here, transmission of an uplink signal by the terminal device means that an uplink signal is transmitted by the terminal device on an uplink transmit beam corresponding to a certain reference signal resource. For example: when there is actual signal transmission (such as PUSCH or SRS transmission) on a certain uplink transmit beam, the terminal device may calculate at least one of the maximum output power, the power headroom and the power reduction information based on the actual signal transmission.

Manner 2: In a case where the terminal device does not transmit an uplink signal, at least one of the maximum output power, the power headroom and the power reduction information is determined based on a specified parameter.

Here, transmission of no uplink signal by the terminal device means that the terminal device does not transmit an uplink signal on an uplink transmit beam corresponding to a certain reference signal resource. For example: when there is no corresponding actual signal transmission on a certain uplink transmit beam, the terminal device may calculate at least one of the maximum output power, the power headroom and the power reduction information based on the parameters specified below.

It should be noted that the calculation of the maximum output power, the power headroom and the power reduction information are required to use parameters such as a transmit bandwidth, a modulation mode, etc., so values of the parameters are required to be clearly configured during the calculation to avoid ambiguous understanding between the network device and the terminal device. The specified parameters may include at least one of the following:
- a reference signal, corresponding to the reference signal resource, for path loss measurement;
- a path loss coefficient corresponding to the reference signal resource;
- a power controlling instruction determined based on a closed-loop power controlling identifier corresponding to the reference signal resource;
- a power controlling instruction corresponding to a first closed-loop power controlling coefficient;
- a first power parameter corresponding to the reference signal resource;
- a second power parameter corresponding to the reference signal resource; and
- a P-MPR corresponding to the reference signal resource.

In the above solution, the first closed-loop power controlling coefficient may be, for example, 0.

In the above solution, the first power parameter may, for example, $P_{O\_NOMINAL\_PUSCH,f,c}$.

In the above solution, the second power parameter may, for example, $P_{O\_SRS,b,f,c}$.

Furthermore, in an example, the maximum output power may be calculated according to MPR=0 dB, A-MPR=0 dB, P-MPR=0 dB, $\Delta T_C$=0 dB, where P-MPR represents permitted maximum output power reduction, MPR represents maximum power reduction corresponding to a modulation mode, A-MPR represents additional maximum power reduction, and $\Delta T_C$ represents additional power relaxation.

Furthermore, in an example, the maximum output power or power headroom may be calculated according to the P-MPR corresponding to the reference signal resource.

Furthermore, optionally, at least one of the maximum output power, the power headroom and the power reduction information may be further determined based on a reference bandwidth. The reference bandwidth may be preset (or stipulated by a protocol) or may be configured by the network device or may be a transmit bandwidth for latest uplink transmission.

For example: the reference bandwidth may be specified as 0 MHz by a protocol.

For example, the reference bandwidth may be configured by the network device through RRC signaling.

For example, the reference bandwidth may be the transmit bandwidth for latest uplink transmission on a same BWP.

Furthermore, optionally, the terminal device may ignore a bandwidth related calculation item when determining at least one of the maximum output power, the power headroom and the power reduction information.

Furthermore, optionally, at least one of the maximum output power, the power headroom and the power reduction information may be further determined according to a reference modulation mode; the reference modulation mode may be preset (or specified by the protocol) or may be configured by the network device or may be a modulation mode for latest uplink transmission.

For example, the reference modulation mode may be configured by the network device through RRC signaling.

For example, the reference modulation mode may be the modulation mode for latest uplink transmission of the terminal device on a same BWP or a same cell.

Furthermore, optionally, when determining at least one of the maximum output power, the power headroom and the power reduction information, the terminal device may ignore a modulation mode related calculation item.

It should be noted that the contents carried in the above first information may be combined arbitrarily to form different specific solutions. The following lists several optional examples of the reporting information.

Assuming that the terminal device determines the reporting information based on a group of CSI-RS resources (assuming a total of N CSI-RS resources, denoted as CSI-RS-1, . . . , CSI-RS-N), the group of CSI-RS resources is configured through the first group of CSI-RS resources, where the reporting information corresponds to M CSI-RS resources in a group of CSI-RS resources, and M is a positive integer less than or equal to N. Some optional examples of the reporting information are as below. It should be pointed out that the following examples may also be applied to SSB or SRS resources.

Example 1: The reporting information includes the CRIs of M CSI-RS resources or the internal serial numbers of the M CSI-RS resources in the N CSI-RS resources (for example, N=8, each CSI-RS resource may represent its internal serial number by 3 bits), the N CSI-RS resources may also be indicated by a bitmap. For the convenience of description, the following only uses CRI as an example for description, and the solution based on the internal serial number is also applicable.

Example 2: The reporting information includes CRIs of M CSI-RS resources, and the corresponding CRIs are recorded as CRI-1, CRI-2, . . . , CRI-M based on the positions of the CRIs of the M CSI-RS resources in the reporting information, where the proposed priority of the CSI-RS resource corresponding to CRI-i is higher than the proposed priority of the CSI-RS resource corresponding to CRI-j (i<j).

Example 3: The reporting information includes CRIs of M CSI-RS resources and corresponding RSRP information (RSRP information may be determined based on an RSRP value measured by the terminal device), and corresponding information is recorded in sequence as (CRI-1 RSRP-1), (CRI-2 RSRP-2), . . . , (CRI-M RSRP-M) according to positions of the CRIs of the M CSI-RS resources and the corresponding RSRP information in the reporting information. The advantage of this example is that the existing reporting format of a downlink beam may be reused, the protocol design is simple, and the terminal implementation complexity is low.

Example 4: The reporting information includes CRIs of M CSI-RS resources and corresponding RSRP information (the RSRP information may be determined based on an RSRP value measured by the terminal device), and corresponding information is recorded in sequence as (CRI-1 RSRP-1), (CRI-2 RSRP-2), . . . , (CRI-M RSRP-M) according to positions of the CRIs of the M CSI-RS resources and the corresponding RSRP information in the reporting information, where the proposed priority of the CSI-RS resource corresponding to CRI-i is higher than the proposed priority of the CSI-RS resource corresponding to CRI-j (i<j). The advantage of this example is that the existing reporting format of the downlink beam may be reused, the protocol design is simple, and the terminal implementation complexity is low.

Example 5: The reporting information includes CRIs of M CSI-RS resources and corresponding RSRP information (the RSRP information may be determined based on an RSRP value measured by the terminal device and power reduction information, for example, the RSRP value obtained by measurement may be corrected according to a difference obtained by power reduction, and the RSRP information required to be reported is obtained), and corresponding information is recorded in sequence as (CRI-1 RSRP-1), (CRI-2 RSRP-2), . . . , (CRI-M RSRP-M) according to positions of the CRIs of the M CSI-RS resources and the corresponding RSRP information in the reporting information. The advantage of this example is to adjust the RSRP value obtained by measurement according to the power reduction information, thereby assisting the network device in determining the uplink transmit beam.

Example 6: The reporting information includes CRIs of M CSI-RS resources, corresponding RSRP information (the RSRP information may be determined based on an RSRP value measured by the terminal device) and proposed priority. According to positions of the CRIs of M CSI-RS resources, the corresponding RSRP information and the proposed priority in the reporting information, corresponding information is recorded in sequence as (CRI-1 RSRP-1 P-1), (CRI-2 RSRP-2 P-2), . . . , (CRI-M RSRP-M PM), where Pi (1≤i≤M) represents the proposed priority of CSI-RS resources indicated by CRI-i. The advantage of this example is that the existing reporting format of a downlink beam may be reused, and priority information may be introduced, which may provide downlink beam information as well as uplink beam information.

Example 7: The reporting information includes CRIs of M CSI-RS resources and corresponding P_CMAX. According to CRIs of M CSI-RS resources and the position of the corresponding P_CMAX in the reporting information, corresponding information is recorded in sequence as (CRI-1 P_CMAX)-1), . . . , (CRI-MP_CMAX-M). The advantage of this example is to provide P_CMAX information corresponding to different uplink transmit beams to assist the network in determining the uplink transmit beam.

Example 8: The reporting information includes CRIs of M CSI-RS resources, corresponding RSRP information and corresponding P_CMAX. According to positions of the CRIs of the M CSI-RS resources, the corresponding RSRP information and the corresponding P_CMAX in the reporting information, corresponding information is recorded in sequence as (CRI-1 RSRP-1 P_CMAX-1), . . . , (CRI-M RSRP-M P_CMAX-M). The advantage of this example is that P_CMAX is introduced in an uplink beam report format, which provides downlink beam related information as well as P_CMAX information corresponding to different uplink transmit beams to assist the network device in determining an uplink transmit beam.

Example 9: The reporting information includes CRIs of M CSI-RS resources and Type 1 power headroom. According to positions of the CRIs of the M CSI-RS resources and the Type 1 power headroom in the reporting information, corresponding information is recorded in sequence as (CRI-1 type1 headroom-1), . . . , (CRI-M type1 headroom-M). The advantage of this example is to provide Type 1 power headroom information corresponding to different uplink transmit beams, thereby assisting the network device in determining an uplink transmit beam.

Example 10: The reporting information includes CRIs of M CSI-RS resources, corresponding RSRP information and Type 1 power headroom. According to positions of the CRIs of the M CSI-RS resources, the corresponding RSRP information and the Type 1 power headroom in the reporting information, corresponding information is recorded in sequence as (CRI-1 RSRP-1 type1 headroom-1), . . . , (CRI-M RSRP-M type1 headroom-M). The advantage of this example is to introduce power headroom in a reporting format of a downlink beam, which may provide downlink beam related information as well as Type1 power headroom information corresponding to different uplink transmit beams, thereby assisting the network device in determining an uplink transmit beam.

Example 11: The reporting information includes CRIs of M CSI-RS resources and corresponding power reduction information. According to positions of the CRIs of the M CSI-RS resources and the corresponding power reduction information in the reporting information, corresponding information is recorded in sequence as (CRI-1 power reduction-1), . . . , (CRI-M power reduction-M). The advantage of this example is to provide power reduction information corresponding to different uplink transmit beams, thereby assisting the network device in determining an uplink transmit beam.

For the reporting information described in the above solution 1, the terminal device may use any of the following manners to transmit the reporting information:

Manner A): The terminal device periodically or semi-persistent sends the reporting information to the network device.

Furthermore, optionally, the reporting information may be transmitted through a PUCCH or a PUSCH.

Here, for a case of periodically sending the reporting information, the terminal device may use a PUCCH to transmit the reporting information, where the PUCCH may adopt PUCCH format 2, or PUCCH format 3, or PUCCH format 4. In a case of periodically sending the reporting information, the terminal device may also use a PUSCH to transmit the reporting information. The advantage of periodic reporting is that the network device may know the beam conditions of the terminal device more instantly, which may improve the speed of response.

Here, for a case of semi-persistently sending the reporting information, the terminal device may use a PUCCH to transmit the reporting information, where the PUCCH may adopt PUCCH format 2, or PUCCH format 3, or PUCCH format 4. For the case of semi-persistently sending the reporting information, the terminal device may also use a PUSCH to transmit the reporting information. Here, the benefit of semi-persistent reporting is to make a balance between a reporting overhead and a quick response.

Manner B) The terminal device aperiodically sends the reporting information to the network device.

Furthermore, optionally, the reporting information is may be transmitted through a PUSCH. Here, the advantage of aperiodic reporting is that the network device may trigger the terminal device to report according to a situation, or the terminal device may trigger the reporting according to its own implementation, thereby reducing the reporting overhead.

Solution 2

The reporting information indicates at least one of the following: the network device is proposed to perform beam management; power reduction meets a first condition; power headroom meets a second condition; the network device is proposed to replace an uplink transmit beam.

For the reporting information described in the above solution 2, the terminal device may transmit the reporting information by the following manner: transmitting the reporting information through a PUCCH. The PUCCH may adopt PUCCH format 0 or PUCCH format 1.

For the case where the terminal device sends the reporting information to the network device through high-level signaling, the contents of the reporting information are implemented by the following solution 3.

Solution 3

The reporting information includes at least one first information. Each first information in the at least one first information corresponds to a reference signal or a reference signal resource, or, each first information in the at least one first information corresponds to a group of reference signals or a group of reference signal resources.

Here, the reporting information may include a rich amount of information, which makes the system more flexible and may reduce the delay of the entire beam management process.

In an optional implementation, each first information in the at least one first information may carry first indication information, and the first indication information is configured to indicate a reference signal resource.

Furthermore, optionally, the first indication information is configured to indicate SRS resources or SSB or CSI-RS resources.

For example, the first indication information may indicate an SRS resource, the SRS resource may be associated with a beam, and the beam may correspond to better transmission performance. This can be applied to systems with good beam correspondence and less ideal beam correspondence.

For example, the first indication information may indicate an SSB, the SSB may be associated with a beam, and the beam may correspond to better transmission performance. This may be applied to systems with better beam correspondence.

For example, the first indication information may indicate a CSI-RS resource, the CSI-RS resource may be associated with a beam, and the beam may correspond to better transmission performance. This can be applied to systems with better beam correspondence.

It should be noted that the reporting information may include at least one first indication information, and different first indication information in the at least one first indication information may indicate the same type of reference signal resources, or may indicate different types of reference signal resources. For example, the first indication information in one first information may indicate one CSI-RS resource, and the first indication information in another first information may indicate one SSB.

Furthermore, optionally, the reporting information may include at least one first indication information, and the position of the at least one first indication information in the report information is configured to indicate the priority of at least one reference signal resource indicated by the at least one first indication information.

Here, the priority of the reference signal resource indicated by the first indication information at the front of the reporting information is higher than the priority of the reference signal resource indicated by the first indicated information at the back of the reporting information, or, the priority of the reference signal resource indicated by the first indication information at the front of the reporting information is lower than the priority of the reference signal resource indicated by the first indication information at the back of the reporting information. In the technical solutions of the embodiments of the present disclosure, the terminal device may implicitly propose priority information to the network device through the position of the first indication information, so as to assist the network device to make better beam judgments.

In an optional implementation, each first information in the at least one first information may carry the first parameter of the reference signal resource corresponding to the first information.

Furthermore, optionally, the first parameter carried in the first information may be determined based on a parameter associated with the reference signal resource corresponding to the first information.

In the above solution, the first parameter may include at least one of the following: maximum output power, a power headroom, and power reduction information.

For example, each first information the at least one first information may carry the maximum output power (P_CMAX) of the reference signal resource corresponding to the first information, where P_CMAX is configured maximum output power. Here, the impact of the power reduction may be implicitly indicated by P_CMAX, so as to avoid displaying the power back off information in the reporting information and avoid disclosing the specific implementation of the terminal. Furthermore, the P_CMAX may be determined based on a parameter associated with a corresponding reference information resource. For example, certain first information may correspond to reference signal resource X, and the P_CMAX carried in this first information may be also determined based on the parameter corresponding to the reference signal resource X. P_CMAX here is beam-specific P_CMAX.

For example, each first information in the at least one first information may carry the power headroom of the reference signal resource corresponding to the first information. Here, the impact of the power reduction may be implicitly indicated by the power headroom, so as to avoid displaying the power reduction information in the reporting information and avoid disclosing the specific implementation of the terminal. Furthermore, the power headroom may be determined based on a parameter associated with a corresponding reference information resource, for example, certain first information may correspond to reference signal resource Y, and the power headroom carried in this first information may be also determined based on the parameter corresponding to the reference signal resource Y, the power headroom here may be beam-specific power headroom. Furthermore, optionally, a type of the power headroom carried in the first information may be Type 1 (Type 1) or Type 2 (Type 2), where Type 1 is the power headroom for a PUSCH, Type 2 is the power headroom for a SRS.

For example, each first information in the at least one first information may carry power reduction information of the reference signal resource corresponding to the first information. Here, the impact of the power reduction is shown in the reporting information, which may directly show the impact of the uplink output power. Furthermore, the power reduction information may be determined based on a parameter associated with a corresponding reference information resource, for example, certain first information may correspond to reference signal resource Z, and the power reduction information carried in this first information may be also determined based on the parameter corresponding to the reference signal resource Z, where the power reduction is beam-specific power reduction.

In the above solution, optionally, the reporting information may include at least one first parameter, and the position of the at least one first parameter in the report information is configured to indicate the priority of the at least one reference signal resource corresponding to the at least one first information.

Optionally, the position of the at least one RSRP information or the position of the at least one first parameter in the reporting information may be determined according to at least one of the following:

a position of the at least one reference signal resource corresponding to the at least one first information in the first configuration information;

an identifier of the at least one reference signal resource corresponding to the at least one first information; and a type of the at least one reference signal resource corresponding to the at least one first information.

In the embodiments of the present disclosure, for a certain reference signal resource (for a certain uplink transmit beam), at least one of its corresponding maximum output power, a power headroom, and power reduction information may be determined in the following manners:

Manner 1: In a case where an uplink signal is transmitted by the terminal device, at least one of the maximum output power, the power headroom, and the power reduction information is determined according to the uplink signal (including uplink data and an uplink reference signal) transmitted by the terminal device.

Here, transmission of an uplink signal by the terminal device means that the uplink signal is transmitted by the terminal device on an uplink transmit beam corresponding to a certain reference signal resource. For example: when there is actual signal transmission (such as PUSCH or SRS transmission) on a certain uplink transmit beam, the terminal device may calculate at least one of the maximum output power, a power headroom, and power reduction information according to the actual signal transmission.

Manner 2: In a case where the terminal device does not transmit an uplink signal, at least one of the maximum output power, the power headroom, and the power reduction information is determined based on a specified parameter.

Here, transmission of no uplink signal by the terminal device means that the terminal device does not transmit an uplink signal on an uplink transmit beam corresponding to a certain reference signal resource. For example: when there is no corresponding actual signal transmission on a certain uplink transmit beam, the terminal device may calculate at least one of the maximum output power, a power headroom, and power reduction information based on parameters specified below.

It should be noted that the calculation of the maximum output power, a power headroom, and power reduction information is required to adopt parameters such as a transmit bandwidth, a modulation mode, etc., so values of the parameters are required to be clearly set during the calculation to avoid ambiguous understanding between the network device and the terminal device. The specified parameters may include at least one of the following:

a reference signal, corresponding to the reference signal resource, for path loss measurement;

a path loss coefficient corresponding to the reference signal resource;

a power controlling instruction determined based on a closed-loop power controlling identifier corresponding to the reference signal resource;

a power controlling instruction corresponding to a first closed-loop power controlling coefficient;

a first power parameter corresponding to the reference signal resource;

a second power parameter corresponding to the reference signal resource; and a P-MPR corresponding to the reference signal resource.

In the above solution, the first closed-loop power controlling coefficient may be, for example, 0.

In the above solution, the first power parameter may be, for example, $P_{0\_NOMINAL\_PUSCH,f,c}$.

In the above solution, the second power parameter may be, for example, $P_{0\_SRS,b,f,c}$.

Furthermore, in an example, the maximum output power may be calculated according to MPR=0 dB, A-MPR=0 dB, P-MPR=0 dB, TC=0 dB, where P-MPR represents permitted maximum output power reduction, MPR represents maximum power reduction corresponding to a modulation mode, A-MPR represents additional maximum power reduction, and TC represents additional power relaxation.

Furthermore, in an example, the maximum output power or power headroom may be calculated according to the P-MPR corresponding to the reference signal resource.

Furthermore, optionally, at least one of the maximum output power, the power headroom, and the power reduction information may be further determined based on a reference bandwidth; the reference bandwidth may be preset (or stipulated by the protocol) or may be configured by the network device or may be a transmit bandwidth for latest uplink transmission.

For example: the reference bandwidth may be specified as 0 MHz by the protocol.

For example, the reference bandwidth may be configured by the network device through RRC signaling.

For example, the reference bandwidth may be the transmit bandwidth for latest uplink transmission of the terminal device on a same BWP or the same cell.

Furthermore, optionally, the terminal device may ignore a bandwidth related calculation item when determining at least one of the maximum output power, the power headroom, and the power reduction information.

Furthermore, optionally, at least one of the maximum output power, the power headroom, and the power reduction information may further determined according to a reference modulation mode; the reference modulation mode may be preset (or specified by the protocol) or may be configured by the network device or may be a modulation mode for latest uplink transmission.

For example, the reference modulation mode may be configured by the network device through RRC signaling.

For example, the reference modulation mode may be the modulation mode for latest uplink transmission on the same BWP.

Furthermore, optionally, when determining at least one of the maximum output power, the power headroom, and the power reduction information, the terminal device may ignore a modulation mode related calculation item.

It should be noted that the contents carried in the above first information may be combined arbitrarily to form different specific solutions.

For the reporting information described in the above solution 3, the terminal device may adopt MAC CE to transmit the reporting information. Furthermore, optionally, the reporting information and a power headroom report (PHR) may be transmitted through a same message. Here, when the terminal device reports the PHR, the terminal device may report the reporting information together with the PHR, so that a PHR report trigger mechanism may be implemented to reduce the complexity of terminal implementation.

In an optional implementation, the reporting information may be carried in a first MAC CE, and the PHR may be carried in a second MAC CE. Alternatively, the reporting information and the PHR may be carried in a first MAC CE.

For example, the MAC CE carrying the PHR is a PHR MAC CE, and the reporting information may be carried in the PHR MAC CE or in another MAC CE.

Furthermore, the MAC CE may include at least a first bitmap, each bit in the first bitmap may correspond to a reference signal resource, and a value of the bit is used to indicate whether the MAC CE carries a first parameter corresponding to the reference signal resource corresponding to the bit (such as maximum output power, a power headroom, power reduction information).

It should be noted that the above optional solutions may be combined arbitrarily to form different MAC CE solutions.

Assuming that the terminal device determines the reporting information according to a group of CSI-RS resources (assuming a total of N CSI-RS resources, denoted as CSI-RS-1, . . . , CSI-RS-N), the group of CSI-RS resources is configured through the first group of CSI-RS resources, where the reporting information corresponds to M CSI-RS resources in a group of CSI-RS resources, and M is a positive integer less than or equal to N. Some optional examples of the reporting information are as follows. It should be pointed out that the following examples may also be applied to SSB or SRS resources.

Example 12: In a MAC CE, one first information carries a power headroom corresponding to one CSI-RS resource (one CSI-RS resource corresponds to one beam). When the MAC CE contains a plurality of power headrooms, the arrangement order of the plurality of power headrooms (the arrangement order may represent a priority order) may have the following options:
  1) It can be determined according to the position of the reference signal resource corresponding to the power headroom in the RRC configuration signaling.
  2) It can be determined according to the size of the identifier of the reference signal resource corresponding to the power headroom (for example, it can be determined from large to small or from small to large according to the identification of the reference signal resource).
  3) It can be determined according to the type of reference signal resource corresponding to the power headroom. For example: SSB>SRS>CSI-RS, SSB>CSI-RS>SRS, SRS>SSB>CSI-RS, SRS>CSI-RS>SSB, CSI-RS>SRS>SSB, CSI-RS>SSB>SRS), where ">" means higher priority.

It should be noted that the above manner 3) can be combined with the manner 1) or the manner 2), that is, 3) is used firstly to determine the arrangement order, and then the manner 1) or the manner 2) is used to further determine the arrangement order in the same type.

Figure 4A:
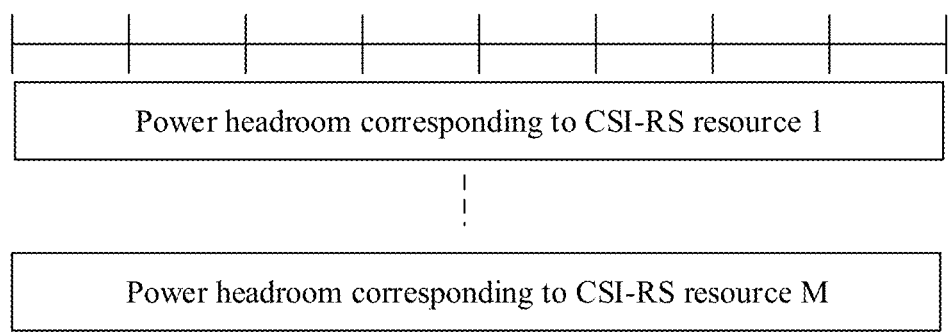
FIG. 4A illustrates a first schematic diagram of an MAC CE according to an embodiment of the present disclosure.

FIG. 4A illustrates a schematic diagram of part of the contents in a MAC CE, in which one row in the figure represents a byte, that is, 8 bits. In FIG. 4A, the reserved bit is not illustrated, and it is not limited to this. There may be some reserved bits in a row, and the remaining bits are used to indicate a power headroom. An example is that 1 bit is a reserved bit, and 7 bit represents a power headroom. In the subsequent schematic diagrams, the reserved bits are not explicitly reserved, but the embodiments of the present disclosure include a partial solution of bit reservation.

Figure 4B:
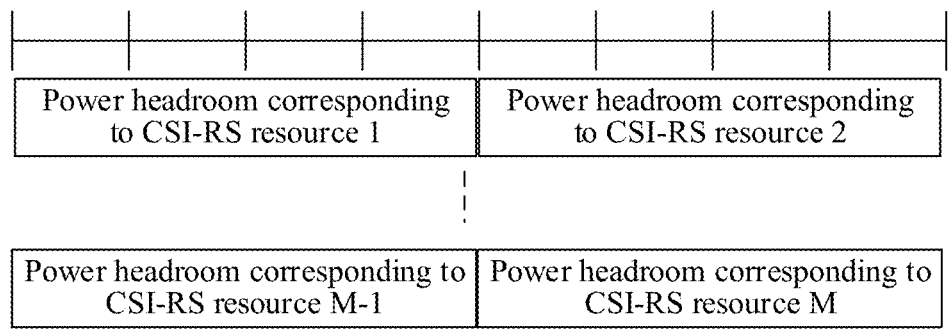
FIG. 4B illustrates a second schematic diagram of an MAC CE according to an embodiment of the present disclosure.

In order to reduce the overhead of reporting information, a plurality of power headrooms may be represented in one byte, as illustrated in FIG. 4B.

In this example, a plurality of power headrooms may be carried by modifying a PHR MAC CE or extending the relevant field, or may be carried by a new MAC CE.

It should be noted that only the power headroom is described in the above example 12, which may also be similarly extended to both power reduction and P_CMAX.

Example 13: In the MAC CE, one first information carries first indication information corresponding to one reference signal resource as well as a corresponding power headroom.

Figure 4C:
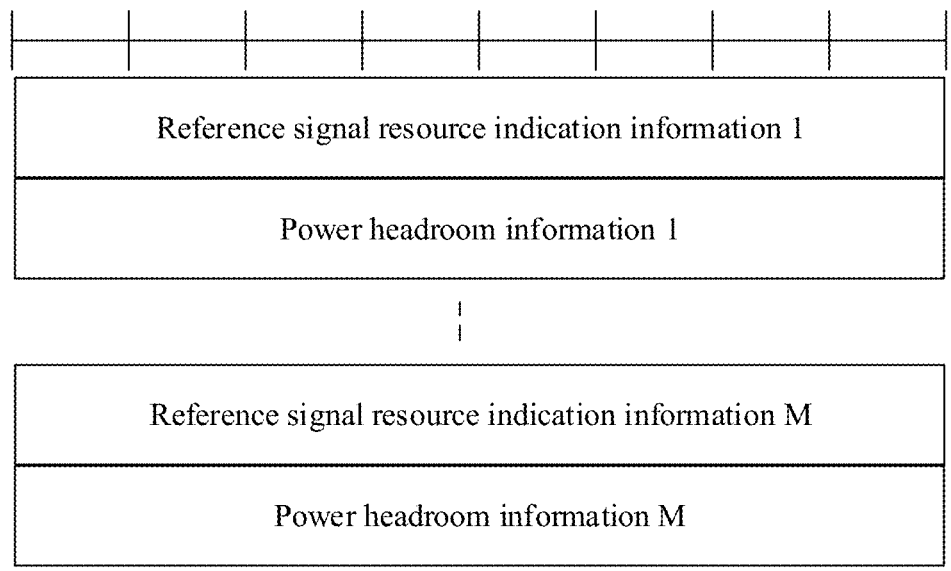
FIG. 4C illustrates a third schematic diagram of an MAC CE according to an embodiment of the present disclosure.

FIG. 4C illustrates a schematic diagram of part of the contents in the MAC CE. In FIG. 4C, the reserved bit is not illustrated, and it is not limited to this. Each row in FIG. 4C may have reserved bits.

Figure 4D:
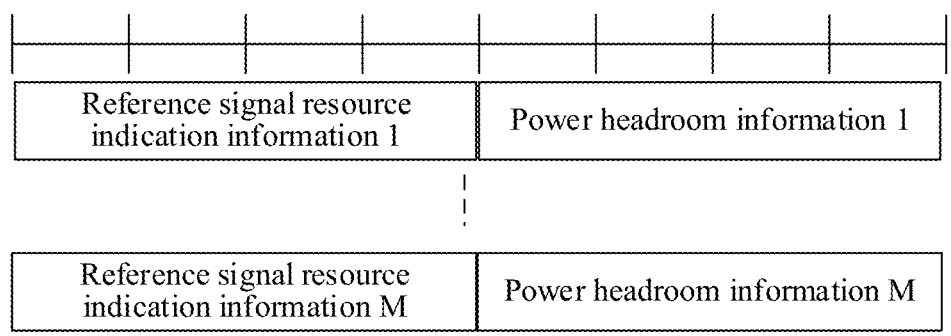
FIG. 4D illustrates a fourth schematic diagram of an MAC CE according to an embodiment of the present disclosure.

In order to reduce the overhead of report, the reference signal resource indication information and the corresponding power headroom may be represented in one byte, as illustrated in FIG. 4D.

In this example, a plurality of power headrooms may be carried by modifying the PHR MAC CE or extending the relevant field, or carried by a new MAC CE.

It should be noted that only power headroom is described in the above example 13, which may also be similarly extended to both power reduction and P_CMAX.

Example 14: In MAC CE, one first information carries a power headroom corresponding to one reference signal resource, where one reference signal resource corresponds to one beam. In addition, a bitmap is used to indicate that a power headroom corresponding to which reference signal resources is carried in the MAC CE. For example, M=2, a 2-bit bitmap is used to indicate that a power headroom corresponding to which reference signal resources is carried in the MAC CE. Among them, in an example, a value of the bit in the bitmap is 1 which means carrying, and a value of 0 means not carrying.

Figure 4E:
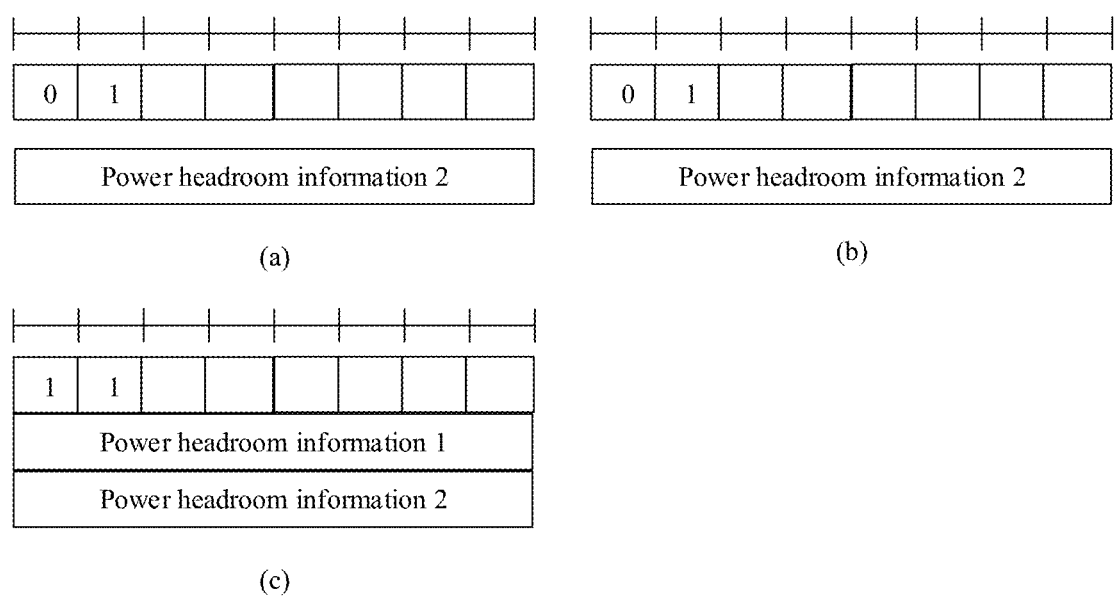
FIG. 4E illustrates a fifth schematic diagram of an MAC CE according to an embodiment of the present disclosure.

FIG. 4E illustrates a schematic diagram of part of the contents in a MAC CE. In FIG. 4E, the reserved bit is not illustrated, and it is not limited to this. Each row in FIG. 4E may have reserved bits. At the same time, assuming that the bitmap is in the first two digits of a byte, the bitmap may also be in other positions in an actual design.

In this example, a plurality of power headrooms may be carried by modifying a PHR MAC CE or extending the relevant field, or may be carried by a new MAC CE. When the PHR MAC CE is used to carry a plurality of power headrooms, the reserved bits in the PHR MAC CE may be used to represent the bitmap, which can further save overhead.

It should be noted that only the case involving power headroom is described in the above example 14, which may also be similarly extended to the case involving both power reduction and P_CMAX.

On the basis of the above solution, terminal device and network device can have the following processing operations.

Processing operations of the terminal device may include: the terminal device decides whether to perform power reduction according to a situation (for example, whether it is close to a human body or other factors).

Processing operation of the network device may include: after the network device receives the reporting information, the network device can perform different processing, for example: when the reporting information contains a plurality of reference signal resource identifiers (corresponding to beam identifiers) and the first parameters corresponding to the reference signal resources (such as power reduction information, P_CMAX, a power headroom), the network device may directly determine an uplink beam to be used from the reporting information, and subsequently notify the terminal device to use the selected uplink beam for uplink transmission.

Figure 5:
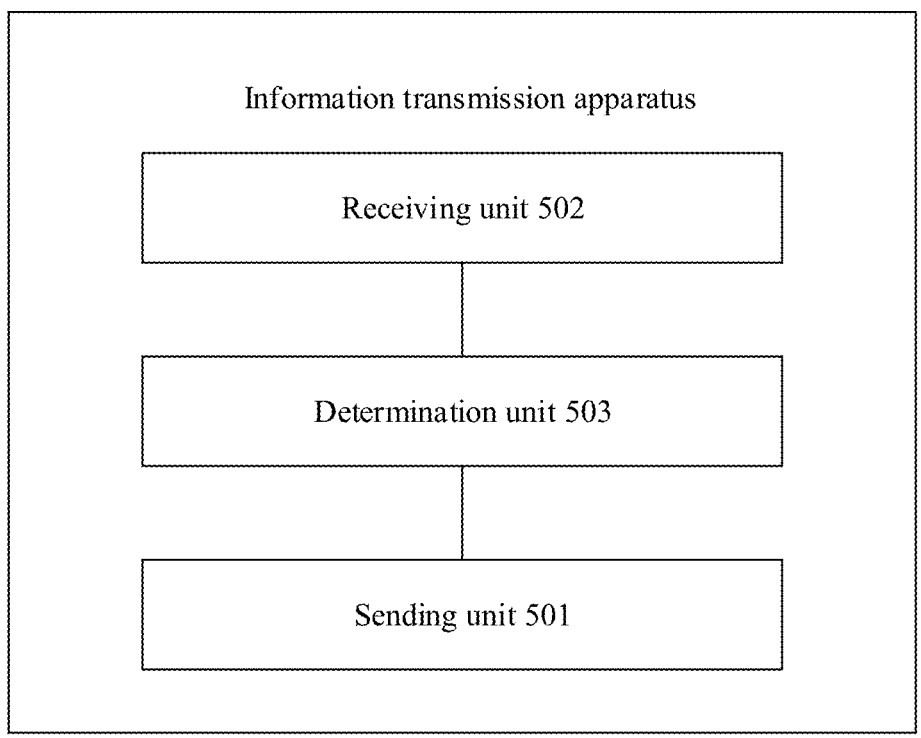
FIG. 5 illustrates a first schematic diagram of composition of an information transmission apparatus according to an embodiment of the present disclosure.

FIG. 5 illustrates a first schematic diagram of composition of an information transmission apparatus according to an embodiment of the present disclosure. As illustrated in FIG. 5, the information apparatus includes a sending unit 501.

The sending unit 501 is configured to send reporting information including at least one first information that is associated with at least one reference signal resource to a network device.

In one implementation, the apparatus may further include a receiving unit 502 and a determination unit 503:

The receiving unit 502 is configured to receive first configuration information that is sent by the network device and configured to determine a group of reference signal resources;

The determination unit 503 is configured to determine the reporting information based on the first configuration information.

In one implementation, the apparatus may further include a receiving unit 502.

The receiving unit 502 is configured to receive second configuration information that is sent by the network device and configured to determine the amount of the at least one first information.

In one implementation, the apparatus may further include a receiving unit 502 and the sending unit 501.

The receiving unit 502 is configured to receive third configuration information that is sent by the network device and configured to determine a measurement report configuration; and The sending unit 501 is configured to send the reporting information to the network device based on the third configuration information.

In one implementation, the third configuration information may include at least a report quantity configuration, and a value of the report quantity configuration is a first report quantity.

In one implementation, the sending unit 501 is configured to send the reporting information to the network device based on a measurement result and/or a power reduction value.

In one implementation, each first information in the at least one first information may correspond to a reference signal or a reference signal resource, or, each first information in the at least one first information may correspond to a group of reference signals or a group of reference signal resources.

In one implementation, each first information in the at least one first information may carry first indication information is configured to indicate a reference signal resource.

In one implementation, the first indication information is configured to indicate a SRS resource or an SSB or a CSI-RS resource.

In one implementation, the reporting information may include at least one first indication information, and a position of the at least one first indication information in the report information is configured to indicate the priority of at least one reference signal resource indicated by the at least one indication information.

In one implementation, the priority of the reference signal resource indicated by the first indication information at the front of the reporting information is higher than the priority of the reference signal resource indicated by the first indication information at the back of the reporting information, or the priority of the reference signal resource indicated by the first indication information at the front of the reporting information is lower than the priority of the reference signal resource indicated by the first indication information at the back of the reporting information.

In one implementation, each first information in the at least one first information may carry RSRP information corresponding to the reference signal resource corresponding to the first information.

In one implementation, the RSRP information may be determined by the terminal device based on an RSRP value obtained by measurement.

In one implementation, the RSRP information may be determined by the terminal device based on a power reduction value and an RSRP value obtained by measurement.

In one implementation, each first information in the at least one first information may carry priority information of the reference signal resource corresponding to the first information.

In one implementation, each first information in the at least one first information may carry a first parameter of the reference signal resource corresponding to the first information.

In one implementation, the reporting information may include at least one first parameter, and a position of the at least one first parameter in the report information is configured to indicate the priority of the at least one reference signal resource corresponding to the at least one the first information.

In one implementation, a position of the at least one RSRP information or a position of the at least one first parameter in the reporting information may be determined according to at least one of the following:

a position of the at least one reference signal resource corresponding to the at least one first information in the first configuration information;

an identifier of the at least one reference signal resource corresponding to the at least one first information; and a type of the at least one reference signal resource corresponding to the at least one first information.

In one implementation, the first parameter carried in the first information may be determined based on a parameter associated with the reference signal resource corresponding to the first information.

In one implementation, the first parameter may include at least one of the following: maximum output power, a power headroom, and power reduction information.

In one implementation, in a case where an uplink signal is transmitted by the terminal device, at least one of the maximum output power, the power headroom, and the power reduction information may be determined based on the uplink signal transmitted by the terminal device.

In one implementation, in a case where the terminal device does not transmit an uplink signal, at least one of the maximum output power, the power headroom, and the power reduction information may be determined based on a specified parameter.

In one implementation, the specified parameter may include at least one of the following:
- a reference signal, corresponding to the reference signal resource, for path loss measurement;
- a path loss coefficient corresponding to the reference signal resource;
- a power controlling instruction determined based on a closed-loop power controlling identifier corresponding to the reference signal resource;
- a power controlling instruction corresponding to a first closed-loop power controlling coefficient;
- a first power parameter corresponding to the reference signal resource;
- a second power parameter corresponding to the reference signal resource; and
- a P-MPR corresponding to the reference signal resource.

In one implementation, at least one of the maximum output power, the power headroom, and the power reduction information may be further determined based on a reference bandwidth. The reference bandwidth may be preset or may be configured by the network device or may be a transmission bandwidth for latest uplink transmission.

In one implementation, the apparatus may further include a determination unit 503.

The determination unit 503 is configured to ignore a bandwidth related calculation item when determining at least one of the maximum output power, the power headroom, and the power reduction information.

In one implementation, at least one of the maximum output power, the power headroom, and the power reduction information may be further determined according to a reference modulation mode that may be preset or may be configured by the network device or may be a modulation mode of latest uplink transmission.

In one implementation, the apparatus may further include a determination unit 503:

The determination unit 503 is configured to ignore a modulation mode related calculation item when determining at least one of the maximum output power, the power headroom, and the power reduction information.

In one implementation, the sending unit is configured to periodically or semi-persistently send the reporting information to the network device.

In one implementation, the reporting information may be transmitted through a PUCCH or a PUSCH.

In one implementation, the sending unit is configured to aperiodically send the reporting information to the network device.

In one implementation, the reporting information may be transmitted through a PUSCH.

In one implementation, the reporting information may indicate at least one of the following:
- the network device is proposed to perform beam management;
- power reduction satisfies a first condition;
- a power headroom satisfies a second condition; and
- the network device is proposed to replace an uplink transmit beam.

In one implementation, the reporting information may be transmitted through PUCCH.

In one implementation, the reporting information may be transmitted through higher-level signaling.

In one implementation, the higher-level signaling may be a MAC CE.

In one implementation, the reporting information and a PHR may be transmitted through a same message.

In one implementation, the reporting information may be carried in a first MAC CE, and the PHR may be carried in a second MAC CE; or, the reporting information and the PHR may be carried in a first MAC CE.

In one implementation, the MAC CE may include at least a first bitmap, each bit in the first bitmap may correspond to a reference signal resource, and a value of the bit is used to indicate whether the MAC CE carries a first parameter corresponding to the reference signal resource corresponding to the bit.

In one implementation, the first parameter may include at least one of the following: maximum output power, a power headroom, and power reduction information.

Those skilled in the art should understand that the relevant description of the above information transmission apparatus in the embodiments of the present disclosure may be understood with reference to the relevant description of the information transmission method in the embodiments of the present disclosure.

Figure 6:
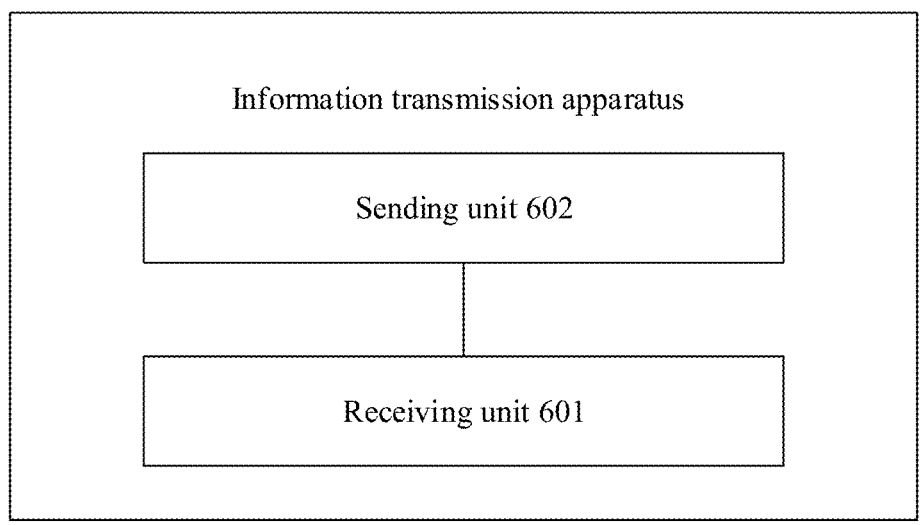
FIG. 6 illustrates a second schematic diagram of composition of an information transmission apparatus according to an embodiment of the present disclosure.

FIG. 6 illustrates a second schematic diagram of composition of an information transmission apparatus according to an embodiment of the present disclosure. As illustrated in FIG. 6, the information transmission apparatus includes a receiving unit 601:

The receiving unit 601 is configured to receive reporting information that is sent by a terminal device and includes at least one first information associated with at least one reference signal resource.

In one implementation, the apparatus may further include a sending unit 602:

The a sending unit 602 is configured to send first configuration information that is configured to determine a group of reference signal resources to the terminal device.

In one implementation, the apparatus may further include a sending unit 602:

The sending unit 602 is configured to send second configuration information that is configured to determine the amount of the at least one first information to the terminal device.

In one implementation, the apparatus may further include a sending unit 602:

The sending unit 602 is configured to send third configuration information that is configured to determine a measurement report configuration to the terminal device.

In one implementation, the third configuration information may at least include a report quantity configuration, a value of the report quantity configuration is a first report quantity.

In one implementation, each first information in the at least one first information may correspond to a reference signal or a reference signal resource, or, each first information in the at least one first information may correspond to a group of reference signals or a group of reference signal resources.

In one implementation, each first information in the at least one first information may carry first indication information and the first indication information is configured to indicate a reference signal resource.

In one implementation, the first indication information is configured to indicate a SRS resource or a SSB or CSI-RS resource.

In one implementation, the reporting information may include at least one first indication information, and a position of the at least one first indication information in the report information is configured to indicate the priority of at least one reference signal resource indicated by the at least one indication information.

In one implementation, the priority of the reference signal resource indicated by the first indication information at the front of the reporting information is higher than the priority of the reference signal resource indicated by the first indication information at the back of the reporting information, or, the priority of the reference signal resource indicated by the first indication information at the front of the reporting information is lower than the priority of the reference signal resource indicated by the first indication information at the back of the reporting information.

In one implementation, each first information in the at least one first information may carry RSRP information corresponding to the reference signal resource corresponding to the first information.

In one implementation, the RSRP information may be determined by the terminal device based on an RSRP value obtained by measurement.

In one implementation, the RSRP information may be determined by the terminal device based on a power reduction value and an RSRP value obtained by measurement.

In one implementation, each first information in the at least one first information may carry priority information of the reference signal resource corresponding to the first information.

In one implementation, each first information in the at least one first information may carry a first parameter of the reference signal resource corresponding to the first information.

In one implementation, the reporting information may include at least one first parameter, and a position of the at least one first parameter in the report information is configured to indicate the priority of the at least one reference signal resource corresponding to the at least one the first information.

In one implementation, a position of the at least one RSRP information or a position of the at least one first parameter in the reporting information may be determined according to at least one of the following:

a position of the at least one reference signal resource corresponding to the at least one first information in the first configuration information;

an identifier of the at least one reference signal resource corresponding to the at least one first information; and a type of the at least one reference signal resource corresponding to the at least one first information.

In one implementation, the first parameter carried in the first information may be determined based on a parameter associated with the reference signal resource corresponding to the first information.

In one implementation, the first parameter may include at least one of the following: maximum output power, a power headroom, and power reduction information.

In one implementation, the receiving unit is configured to receive the reporting information periodically or semi-persistently sent by the terminal device.

In one implementation, the reporting information may be transmitted through a PUCCH or a PUSCH.

In one implementation, the receiving unit is configured to receive the reporting information aperiodically sent by the terminal device.

In one implementation, the reporting information may be transmitted through PUSCH.

In one implementation, the reporting information may indicate at least one of the following:

the network device is proposed to perform beam management;

power reduction satisfies a first condition;

a power headroom satisfies a second condition; and the network device is proposed to replace an uplink transmit beam.

In one implementation, the reporting information may be transmitted through a PUCCH.

In one implementation, the reporting information may be transmitted through higher-level signaling.

In one implementation, the higher-level signaling may be a MAC CE.

In one implementation, the reporting information and a PHR may be transmitted through a same message.

In one implementation, the reporting information may be carried in a first MAC CE, and the PHR may be carried in a second MAC CE; or, the reporting information and the PHR may be carried in a first MAC CE.

In one implementation, the MAC CE may include at least a first bitmap, each bit in the first bitmap may correspond to a reference signal resource, and a value of the bit is used to indicate whether the MAC CE carries a first parameter corresponding to the reference signal resource corresponding to the bit.

In one implementation, the first parameter may include at least one of the following: maximum output power, a power headroom, and power reduction information.

Those skilled in the art should understand that the relevant description of the above information transmission apparatus in the embodiments of the present disclosure may be understood with reference to the relevant description of the information transmission method in the embodiments of the present disclosure.

Figure 7:
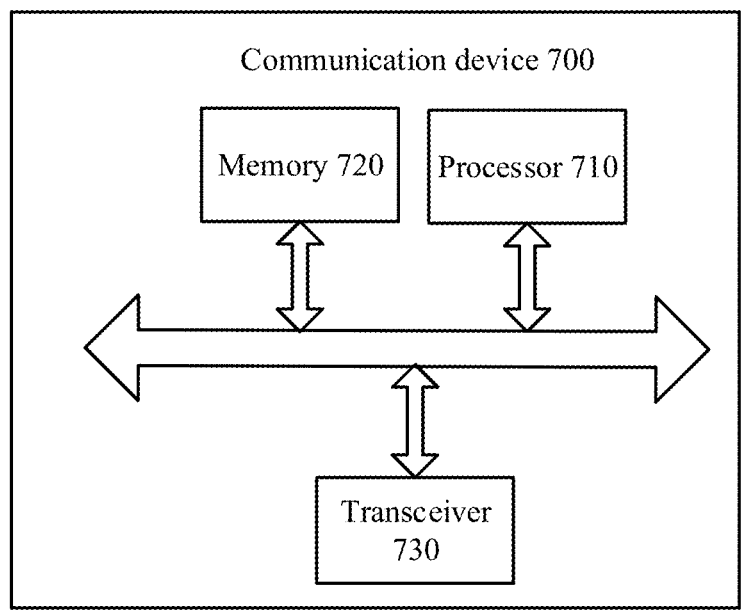
FIG. 7 illustrates a schematic diagram of a communication device according to an embodiment of the present disclosure.

FIG. 7 illustrates a schematic diagram of a communication device according to an embodiment of the present disclosure. The communication device may be a terminal device or a network device. The communication device 700 illustrated in FIG. 7 includes a processor 710, and the processor 710 may call and run a computer program from a memory to implement the method in the embodiments of the present disclosure.

Optionally, as illustrated in FIG. 7, the communication device 700 may further include a memory 720. The processor 710 may call and run a computer program from the memory 720 to implement the method in the embodiments of the present disclosure.

The memory 720 may be a separate device independent of the processor 710, or may be integrated in the processor 710.

Optionally, as illustrated in FIG. 7, the communication device 700 may further include a transceiver 730, and the processor 710 may control the transceiver 730 to communicate with other devices. Specifically, it may send information or data to other devices, or receive information or data sent by other devices.

The transceiver 730 may include a transmitter and a receiver. The transceiver 730 may further include an antenna, and the amount of antennas may be one or more.

Optionally, the communication device 700 may specifically be a network device in the embodiments of the present disclosure, and the communication device 700 may implement the corresponding process implemented by the network device in each method of the embodiments of the present disclosure. For brevity, details will not be repeated here.

Optionally, the communication device 700 may specifically be a mobile terminal/terminal of the embodiments of the present disclosure, and the communication device 700 may implement the corresponding process implemented by the mobile terminal/terminal in each method of the embodiments of the present disclosure. For the sake of brevity, this will not be repeated here.

Figure 8:
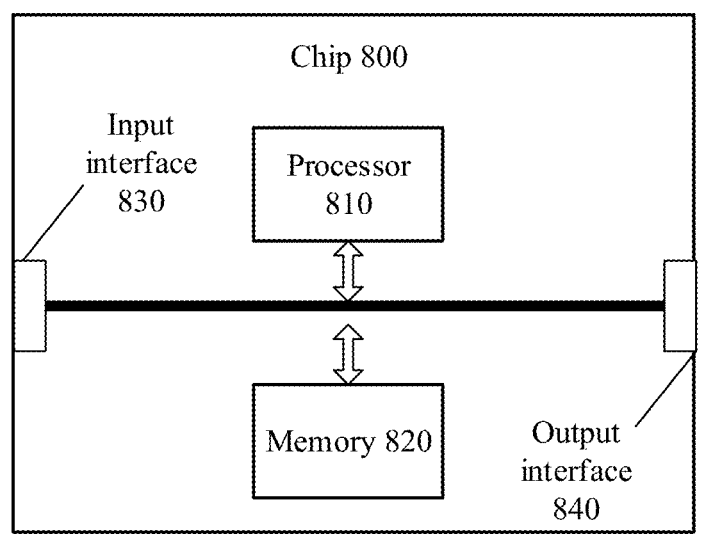
FIG. 8 illustrates a schematic diagram of a chip according to an embodiment of the present disclosure.

FIG. 8 illustrates a schematic diagram of a chip in an embodiment of the present disclosure. The chip 800 illustrated in FIG. 8 includes a processor 810, and the processor 810 may call and run a computer program from the memory to implement the methods in the embodiments of the present disclosure.

Optionally, as illustrated in FIG. 8, the chip 800 may further include a memory 820. The processor 810 may call and run a computer program from the memory 820 to implement the methods in the embodiments of the present disclosure.

The memory 820 may be a separate device independent of the processor 810, or may be integrated in the processor 810.

Optionally, the chip 800 may further include an input interface 830. The processor 810 may control the input interface 830 to communicate with other devices or chips, and specifically, may obtain information or data sent by other devices or chips.

Optionally, the chip 800 may further include an output interface 840. The processor 810 may control the output interface 840 to communicate with other devices or chips, and specifically, may output information or data to other devices or chips.

Optionally, the chip may be applied to the network device in the embodiments of the present disclosure, and the chip may implement the corresponding process implemented by the network device in each method of the embodiments of the present disclosure. For the sake of brevity, the details will not repeated here.

Optionally, the chip may be applied to the mobile terminal/terminal in the embodiments of the present disclosure, and the chip may implement the corresponding process implemented by the mobile terminal/terminal in each method of the embodiments of the present disclosure. For the sake of brevity, it will not be repeated here.

It should be understood that the chip mentioned in the embodiments of the present disclosure may also be referred to as a system level chip, a system chip, a chip system or a system-on-chip chip, etc.

Figure 9:
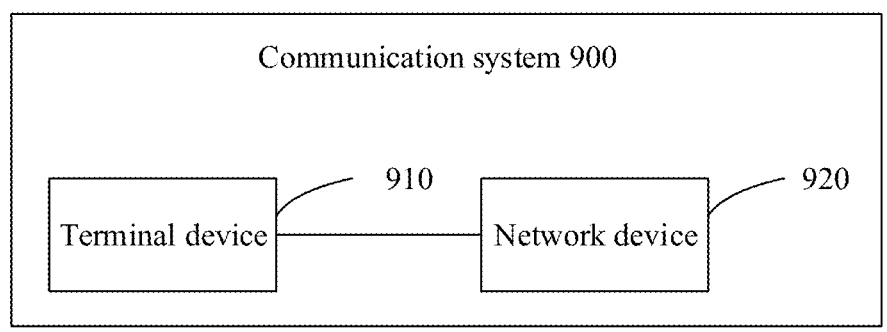
FIG. 9 illustrates a schematic block diagram of a communication system according to an embodiment of the present disclosure.

FIG. 9 illustrates a schematic block diagram of a communication system 900 according to an embodiment of the present disclosure. As illustrated in FIG. 9, the communication system 900 includes a terminal device 910 and a network device 920.

The terminal device 910 may be used to implement the corresponding functions implemented by the terminal in the above methods, and the network device 920 may be used to implement the corresponding functions implemented by the network device in the above methods. For sake of brevity, details will not repeated here.

It should be understood that the processor in the embodiments of the present disclosure may be an integrated circuit chip with signal processing capability. In the implementation process, the operations in the above method embodiments may be completed by hardware integrated logic circuits in the processor or instructions in the form of software. The above processor may be a general-purpose processor, a digital signal processor (DSP), an application specific integrated circuit (ASIC), a field programmable gate array (FPGA) or other programmable logic devices, a discrete gate or a transistor logic device, a discrete hardware component. The methods, operations, and logical block diagrams disclosed in the embodiments of the present disclosure may be implemented or executed. The general-purpose processor may be a microprocessor or the processor may also be any conventional processor or the like. The operations in the method disclosed in the embodiments of the present disclosure may be directly embodied as being executed and completed by a hardware decoding processor, or executed and completed by a combination of hardware and software modules in the decoding processor. The software module may be located in a mature storage medium in the field, such as random access memory, flash memory, read-only memory, programmable read-only memory, or electrically erasable programmable memory, registers. The storage medium is located in the memory, and the processor reads the information in the memory and completes the operations in the above methods in combination with its hardware.

It may be understood that the memory in the embodiments of the present disclosure may be a volatile memory or a non-volatile memory, or may include both volatile and non-volatile memory. Among them, the non-volatile memory may be read-only memory (ROM), programmable read-only memory (PROM), erasable programmable read-only memory (Erasable PROM, EPROM), and electrically erasable programmable read-only memory (Electrically EPROM, EEPROM) or flash memory. The volatile memory may be a random access memory (RAM), which is used as an external cache. By way of exemplary but not restrictive description, many forms of RAM are available, such as static random access memory (Static RAM, SRAM), dynamic random access memory (Dynamic RAM, DRAM), synchronous dynamic random access memory (Synchronous DRAM, SDRAM), double data rate synchronous dynamic random access memory (DDR SDRAM), enhanced synchronous dynamic random access memory (Enhanced SDRAM, ESDRAM), synchlink dynamic random access memory (Synchlink DRAM, SLDRAM) and direct rambus random access memory (DR RAM). It should be noted that the memories of the systems and methods described herein are intended to include, but are not limited to, these and any other suitable types of memories.

It should be understood that the above memory is exemplary but not restrictive. For example, the memory in the embodiments of the present disclosure may also be static random access memory (static RAM, SRAM), dynamic random access memory (dynamic RAM, DRAM), synchronous dynamic random access memory (synchronous DRAM, SDRAM), double data rate synchronous dynamic random access memory (double data rate SDRAM, DDR SDRAM), enhanced synchronous dynamic random access memory (enhanced SDRAM, ESDRAM), synch link dynamic random access memory (synch link DRAM, SLDRAM) and direct rambus random access memory (Direct Rambus RAM, DR RAM), etc. That is to say, the memory in the embodiments of the present disclosure is intended to include, but is not limited to, these and any other suitable types of memory.

The embodiments of the present disclosure also provide a computer-readable storage medium for storing computer programs.

Optionally, the computer-readable storage medium may be applied to the network device in the embodiments of the present disclosure, and the computer program causes the computer to execute the corresponding processes implemented by the network device in the various methods of the embodiments of the present disclosure, which will not be repeated here, for the sake of brevity.

Optionally, the computer-readable storage medium may be applied to the mobile terminal/terminal in the embodiments of the present disclosure, and the computer program causes the computer to execute the corresponding processes implemented by the mobile terminal/terminal in the various methods of the embodiments of the present disclosure, which will not be repeated here, for the sake of brevity.

The embodiments of the present disclosure also provide a computer program product, including computer program instructions.

Optionally, the computer program product may be applied to the network device in the embodiments of the present disclosure, and the computer program instructions cause the computer to execute the corresponding processes implemented by the network device in various methods of the embodiments of the present disclosure, which will not be repeated here, for the sake of brevity.

Optionally, the computer program product may be applied to the mobile terminal/terminal in the embodiments of the present disclosure, and the computer program instructions cause the computer to execute the corresponding processes implemented by the mobile terminal/terminal in the various methods of the embodiments of the present disclosure, which will not be repeated here, for the sake of brevity.

An embodiment of the present disclosure provides a computer program.

Optionally, the computer program may be applied to the network device in the embodiments of the present disclosure. When the computer program runs on the computer, it causes the computer to execute the corresponding processes implemented by the network device in the various methods of the embodiments of the present disclosure, which will not be repeated here, for the sake of brevity.

Optionally, the computer program may be applied to the mobile terminal/terminal in the embodiments of the present disclosure. When the computer program runs on the computer, it causes the computer to execute the corresponding processes implemented by the mobile terminal/terminal in the various methods of the embodiments of the present disclosure, which will not be repeated here, for the sake of brevity.

Those of ordinary skill in the art may be aware that the units and algorithm operations of the various examples described in combination with the embodiments disclosed herein may be implemented by electronic hardware or a combination of computer software and electronic hardware. Whether these functions are executed by hardware or software depends on the specific application and design constraint conditions of the technical solution. Professionals and technicians may use different methods for each specific application to implement the described functions, but such implementation should not be considered beyond the scope of the present disclosure.

Those skilled in the art may clearly understand that, for the convenience and conciseness of description, the specific working processes of the above system, apparatus, and unit may refer to the corresponding processes in the above method embodiments, which is not repeated here.

In the several embodiments provided in the present disclosure, it should be understood that the disclosed system, apparatus, and method may be implemented in other ways. For example, the device embodiments described above are only illustrative. For example, the division of the units is only a logical function division, and there may be other divisions in actual implementation, for example, a plurality of units or components may be combined or may be integrated into another system, or some features may be ignored or not implemented. In addition, the displayed or discussed mutual coupling or direct coupling or communication connection may be indirect coupling or communication connection through some interfaces, apparatuses or units, and may be in electrical, mechanical or other forms.

The units described as separate components may or may not be physically separated, and the components displayed as units may or may not be physical units, that is, they may be located in one place, or they may be distributed on a plurality of network units. Some or all of the units may be selected according to actual needs to achieve the objectives in the solutions of this embodiment.

In addition, the functional units in the various embodiments of the present disclosure may be integrated into one processing unit, or each unit may exist alone physically, or two or more units may be integrated into one unit.

When the function is implemented in the form of a software functional unit and sold or used as an independent product, it may be stored in a computer readable storage medium. According to this understanding, the technical solutions of the present disclosure essentially or the part that contributes to the prior art or the part of the technical solutions may be embodied in the form of a software product, and the computer software product is stored in a storage medium, including several instructions for causing a computer device (which may be a personal computer, a server, or a network device, etc.) to execute all or part of the operations in the methods described in the various embodiments of the present disclosure. The above storage media include: an U disk, a mobile hard disk, a read-only memory (Read-Only Memory) a ROM, a random access memory (RAM), a magnetic disk or an optical disk and other media that may store program code.

The above are only specific implementations of the present disclosure, but the protection scope of the present disclosure is not limited to this. Any person skilled in the art may easily conceive of changes or substitutions within the technical scope disclosed in the present disclosure, and they should be covered within the protection scope of the present disclosure. Therefore, the protection scope of the present disclosure shall be subject to the protection scope of the claims.

The invention claimed is:

1. An information transmission method, comprising:
sending, by a terminal device, reporting information to a network device, the reporting information comprising at least one first information and the at least one first information being associated with at least one reference signal resource, wherein each first information in the at least one first information corresponds to a reference signal or a reference signal resource, or, each first information in the at least one first information corresponds to a group of reference signals or a group of reference signal resources, wherein each first information in the at least one first information carries first indication information and the first indication information indicates a reference signal resource, wherein the first indication information indicates a sounding reference signal (SRS) resource or a synchronization signal block (SSB) or a channel state information reference signal (CSI-RS) resource, wherein the reporting information comprises at least one first indication information, and a position of the at least one first indication information in the report information indicates priority of at least one reference signal resource indicated by the at least one indication information, wherein priority of a reference signal resource indicated by first indication information at a front of the reporting information is higher than priority of a reference signal resource indicated by first indicated information at a back of the reporting information, or, priority of the reference signal resource indicated by the first indication information at the front of the reporting information is lower than priority of the reference signal resource indicated by the first indication information at the back of the reporting information.

2. The method according to claim 1, further comprising:
receiving, by the terminal device, first configuration information from the network device, first configuration information being configured to determine a group of reference signal resources; and determining, by the terminal device, the reporting information based on the first configuration information; or receiving, by the terminal device, second configuration information from the network device, the second configuration information being configured to determine an amount of the at least one first information; or, receiving, by the terminal device, third configuration information from the network device, the third configuration information being configured to determine a measurement report configuration;

wherein sending, by the terminal device, the reporting information to the network device comprises: sending the reporting information to the network device by the terminal device based on the third configuration information, wherein the third configuration information at least comprises a report quantity configuration, and a value of the report quantity configuration is a first report quantity.

3. The method according to claim 1, wherein sending, by the terminal device, the reporting information to the network device comprises:
sending the reporting information to the network device by the terminal device based on at least one of a measurement result or a power reduction value.

4. The method according to claim 1, wherein
each first information in the at least one first information carries reference signal receiving power (RSRP) information corresponding to the reference signal resource corresponding to the first information, wherein the RSRP information is determined by the terminal device based on an RSRP value obtained by measurement or the RSRP information is determined by the terminal device based on a power reduction value and an RSRP value obtained by measurement; or each first information in the at least one first information carries priority information of the reference signal resource corresponding to the first information.

5. The method according to claim 1, wherein each first information in the at least one first information carries a first parameter of the reference signal resource corresponding to the first information, wherein the reporting information comprises at least one first parameter, and a position of the at least one first parameter in the report information indicates priority of the at least one reference signal resource corresponding to the at least one first information, wherein a position of the at least one RSRP information or a position of the at least one first parameter in the reporting information is determined according to at least one of the following:
a position of the at least one reference signal resource corresponding to the at least one first information in the first configuration information;
an identifier of the at least one reference signal resource corresponding to the at least one first information; or
a type of the at least one reference signal resource corresponding to the at least one first information, wherein the first parameter carried in the first information is determined based on a parameter associated with the reference signal resource corresponding to the first information, wherein the first parameter comprises at least one of the following: maximum output power, a power headroom, or power reduction information, wherein in a case where the terminal device does not transmit an uplink signal, at least one of the maximum output power, the power headroom, or the power reduction information is determined based on a specified parameter, wherein the specified parameter comprises at least one of the following:
a reference signal, corresponding to the reference signal resource, for path loss measurement;
a path loss coefficient corresponding to the reference signal resource;
a power controlling instruction determined based on a closed-loop power controlling identifier corresponding to the reference signal resource;
a power controlling instruction corresponding to a first closed-loop power controlling coefficient;
a first power parameter corresponding to the reference signal resource;
a second power parameter corresponding to the reference signal resource; or
a permitted maximum power reduction (P-MPR) corresponding to the reference signal resource, wherein at least one of the maximum output power, the power headroom, or the power reduction information is further determined based on a reference bandwidth; the reference bandwidth is preset or is configured by the network device or is a transmission bandwidth for latest uplink transmission.

6. An information transmission apparatus, comprising:
a processor; and
a transceiver, connected to the processor and configured to send reporting information comprising at least one first information to a network device, the at least one first information being associated with at least one reference signal resource, wherein each first information in the at least one first information corresponds to a reference signal or a reference signal resource, or, each first information in the at least one first information corresponds to a group of reference signals or a group of reference signal resources, wherein each first information in the at least one first information carries first indication information and the first indication information indicates a reference signal resource, wherein the first indication information indicates a sounding reference signal (SRS) resource or a synchronization signal block (SSB) or a channel state information reference signal (CSI-RS) resource, wherein the reporting information comprises at least one first indication information, and a position of the at least one first indication information in the report information indicates priority of at least one reference signal resource indicated by the at least one indication information, wherein priority of a reference signal resource indicated by first indication information at a front of the reporting information is higher than priority of a reference signal resource indicated by first indicated information at a back of the reporting information, or, priority of the reference signal resource indicated by the first indication information at the front of the reporting information is lower than priority of the reference signal resource indicated by the first indication information at the back of the reporting information.

7. The apparatus according to claim 6, wherein each first information in the at least one first information carries a first parameter of the reference signal resource corresponding to the first information, wherein the first parameter includes at least one of the following: maximum output power, a power headroom, or power reduction information, wherein in a case where the terminal device does not transmit an uplink signal, at least one of the maximum output power, the power headroom, or the power reduction information is determined based on a specified parameter, wherein the processor is configured to ignore a bandwidth related calculation item when determining at least one of the maximum output power, the power headroom, or the power reduction information, wherein at least one of the maximum output power, the power headroom, or the power reduction information is further determined according to a reference modulation mode that is preset or is configured by the network device or is a modulation mode of latest uplink transmission, wherein the processor is further configured to ignore a modulation mode related calculation item when determining at least one of the maximum output power, the power headroom, or the power reduction information.

8. The apparatus according to claim 6, wherein
the transceiver is further configured to periodically or semi-persistently send the reporting information to the network device, wherein the reporting information is transmitted through a physical uplink control channel (PUCCH) or a physical uplink shared channel (PUSCH); or
the transceiver is further configured to aperiodically send the reporting information to the network device, wherein the reporting information is transmitted through a PUSCH.

9. The apparatus according to claim 6, wherein the reporting information indicates at least one of the following:

the network device is proposed to perform beam management;

power reduction satisfies a first condition;

a power headroom satisfies a second condition; or the network device is proposed to replace an uplink transmit beam, wherein the reporting information is transmitted through a PUCCH.

10. The apparatus according to claim 6, wherein the reporting information is transmitted through higher-level signaling, and the higher-level signaling is a media access control control element (MAC CE), wherein the reporting information and a power headroom report (PHR) are transmitted through a same message, wherein the reporting information is carried in a first MAC CE and the PHR is carried in a second MAC CE; or, the reporting information and the PHR are carried in a first MAC CE, wherein the MAC CE at least comprises a first bitmap, each bit in the first bitmap corresponds to a reference signal resource, and a value of the bit is used to indicate whether the MAC CE carries a first parameter corresponding to the reference signal resource corresponding to the bit, wherein the first parameter comprises at least one of the following: maximum output power, a power headroom, or power reduction information.

11. An information transmission apparatus, comprising:

a processor; and a transceiver, connected to the processor and configured to receive reporting information that is sent by a terminal device and comprises at least one first information associated with at least one reference signal resource, wherein each first information in the at least one first information corresponds to a reference signal or a reference signal resource, or, each first information in the at least one first information corresponds to a group of reference signals or a group of reference signal resources, wherein each first information in the at least one first information carries first indication information and the first indication information indicates a reference signal resource, wherein the first indication information indicates a sounding reference signal (SRS) resource or a synchronization signal block (SSB) or a channel state information reference signal (CSI-RS) resource, wherein the reporting information comprises at least one first indication information, and a position of the at least one first indication information in the report information indicates priority of at least one reference signal resource indicated by the at least one indication information, wherein priority of a reference signal resource indicated by first indication information at a front of the reporting information is higher than priority of a reference signal resource indicated by first indicated information at a back of the reporting information, or, priority of the reference signal resource indicated by the first indication information at the front of the reporting information is lower than priority of the reference signal resource indicated by the first indication information at the back of the reporting information.

12. The apparatus according to claim 11, wherein:
the transceiver is further configured to send first configuration information that is configured to determine a group of reference signal resources to a terminal device; or
the transceiver is further configured to send second configuration information that is configured to determine an amount of the at least one first information to the terminal device; or
the transceiver is further configured to send third configuration information that is configured to determine a measurement report configuration to the terminal device.

13. The apparatus according to claim 4, wherein the third configuration information at least comprises a report quantity configuration, a value of the report quantity configuration is a first report quantity.

14. The apparatus according to claim 11, wherein the transceiver is configured to receive the reporting information aperiodically sent by the terminal device,
wherein the reporting information is transmitted through a PUSCH.

15. The apparatus according to claim 11, wherein the reporting information is transmitted through higher-level signaling, and the higher-level signaling is a media access control control element (MAC CE),
wherein the reporting information and a power headroom report (PHR) are transmitted through a same message.

16. The apparatus according to claim 15, wherein:
the reporting information is carried in a first MAC CE, and the PHR is carried in a second MAC CE; or, the reporting information and the PHR are carried in a first MAC CE,
wherein the MAC CE at least comprises a first bitmap, each bit in the first bitmap corresponds to a reference signal resource, and a value of the bit is used to indicate whether the MAC CE carries a first parameter corresponding to the reference signal resource corresponding to the bit,
wherein the first parameter comprises at least one of the following: maximum output power, a power headroom, or power reduction information.

* * * * *